United States Patent
Soni

(10) Patent No.: US 10,994,229 B1
(45) Date of Patent: May 4, 2021

(54) WATER FILTRATION SYSTEM

(71) Applicant: IP33 LTD, Oadby Leicester (GB)

(72) Inventor: Piush Soni, Middlesex (GB)

(73) Assignee: IP33 LTD, Leicester (GB)

( * ) Notice: Subject to any disclaimer, the term of this patent is extended or adjusted under 35 U.S.C. 154(b) by 0 days.

(21) Appl. No.: 16/735,615

(22) Filed: Jan. 6, 2020

Related U.S. Application Data

(60) Provisional application No. 62/936,111, filed on Nov. 25, 2019, provisional application No. 62/948,784, filed on Dec. 16, 2019.

(51) Int. Cl.
| | | |
|---|---|---|
| *B01D 29/21* | (2006.01) |
| *B01D 35/30* | (2006.01) |
| *C02F 1/00* | (2006.01) |
| *B01D 29/58* | (2006.01) |
| *C02F 1/28* | (2006.01) |
| *B01D 29/92* | (2006.01) |

(52) U.S. Cl.
CPC ............ *B01D 29/21* (2013.01); *B01D 29/58* (2013.01); *B01D 29/92* (2013.01); *B01D 35/30* (2013.01); *C02F 1/001* (2013.01); *C02F 1/283* (2013.01); *C02F 2201/003* (2013.01)

(58) Field of Classification Search
CPC .... B01D 29/58; C02F 2201/003; C02F 9/005; C02F 2307/02
USPC ........ 210/437, 438, 446, 464, 315, 316, 338
See application file for complete search history.

(56) References Cited

U.S. PATENT DOCUMENTS

| | | | | |
|---|---|---|---|---|
| 4,828,698 A | * | 5/1989 | Jewell | ............ B01D 27/02 |
| | | | | 210/266 |
| 5,017,286 A | * | 5/1991 | Heiligman | ........... B01D 35/043 |
| | | | | 210/266 |
| 5,259,954 A | | 11/1993 | Taylor | |
| 5,266,196 A | * | 11/1993 | Fife | ........ B01D 35/147 |
| | | | | 210/416.3 |
| 5,824,232 A | | 10/1998 | Asher et al. | |
| 6,325,929 B1 | | 12/2001 | Bassett | |
| 6,464,870 B1 | | 10/2002 | Castellanos et al. | |
| 7,081,201 B2 | | 7/2006 | Bassett et al. | |
| 7,390,343 B2 | | 6/2008 | Tepper et al. | |
| 7,601,262 B1 | | 10/2009 | Tepper et al. | |
| 7,618,480 B2 | | 11/2009 | Barnwell | |

(Continued)

FOREIGN PATENT DOCUMENTS

| | | |
|---|---|---|
| JP | 10113507 A | 5/1998 |
| WO | 2006031838 A1 | 3/2006 |

OTHER PUBLICATIONS

Rowzee, M., et al., "A Filter for All Occasions", Reeves Journal 2.0 85.7: pp. 102-103 (Jul. 2005).

*Primary Examiner* — Benjamin M Kurtz
(74) *Attorney, Agent, or Firm* — Browdy and Neimark, P.L.L.C.

(57) ABSTRACT

A filter assembly includes an inlet end, a sediment filter having a sediment filter surface facing the inlet end and cylindrical filters. The sediment filter surface is orthogonal to each cylindrical filter surface. A first channel and a second channel may fluidly connect the sediment filter to the more cylindrical filters. The first channel can have a central axis that is orthogonal to a central axis to the more than one cylindrical filter. A central axis of the second channel may be in a direction along the length of the more than one cylindrical filter.

19 Claims, 29 Drawing Sheets

(56) References Cited

U.S. PATENT DOCUMENTS

| | | | |
|---|---|---|---|
| 7,862,720 B2 * | 1/2011 | Brown | C02F 1/002 |
| | | | 210/335 |
| 8,701,895 B2 | 4/2014 | Levy | |
| 9,162,167 B2 * | 10/2015 | Brown | B01D 29/111 |
| 9,309,131 B2 | 4/2016 | Kaledin et al. | |
| 9,707,538 B2 | 7/2017 | Kaledin et al. | |
| 2004/0055939 A1 * | 3/2004 | Wybo | B01D 29/07 |
| | | | 210/167.11 |
| 2004/0206682 A1 * | 10/2004 | Hamlin | B01D 61/18 |
| | | | 210/321.6 |
| 2005/0035041 A1 * | 2/2005 | Nohren, Jr. | B01D 61/20 |
| | | | 210/209 |
| 2009/0308811 A1 | 12/2009 | Tepper et al. | |
| 2015/0053602 A1 * | 2/2015 | Pritchard | C02F 1/44 |
| | | | 210/321.89 |

\* cited by examiner

Individual segments making up the filter stack

WATER FILTRATION SYSTEM

CROSS-REFERENCE TO RELATED APPLICATIONS

This non-provisional U.S. patent application filed under 35 USC § 111 claims priority to U.S. provisional patent applications 62/936,111 filed on Nov. 15, 2019 and 62/948,784 filed on Dec. 16, 2019, which are incorporated by reference herein.

BACKGROUND OF THE INVENTION

Field of the Invention

The application relates to filtration devices and more particularly to water filtration systems for drinking water and other liquids.

Background

In developing countries, about 80% of illnesses are linked to poor water and sanitation conditions. 1 out of every 5 deaths under the age of 5 worldwide is due to a water-related disease.

Clean and safe water is essential to healthy living, but clean drinking water remains inaccessible to many people in less industrialized countries that have lower per capita income levels than more developed countries.

Water pollution may include physical, chemical and biological pollutants such as turbidity, metals, organic matter and bacteria. Various technologies are used to remove contaminants including physical processes to remove pollutants by filtration, coagulation and flocculation, and disinfectant processes such as chlorination.

Referring to FIG. 16-18, traditional sediment filters are constructed with punched holes pore sizes of the same or similar sizes in a flat structure. Dust distribution is as per pore size if layered. Flow through the filter is generally in a straight line from the filter surface facing the inlet and out through the filter surface facing the outlet. Once the holes become blocked with sediment the flow rate reduces.

Various types of portable filter systems are available for clean drinking water. However, some small systems can have limited capacity or filtration lifespan and can also be fragile and/or expensive. Thus, a need exists for an improved portable water filtration system.

BRIEF SUMMARY OF THE INVENTION

In one general aspect, a filter assembly includes an inlet end, a sediment filter having a sediment filter surface facing the inlet end and generally cylindrical filters. The sediment filter surface is orthogonal to each generally cylindrical filter surface.

Embodiments may include one or more of the following features. For example, the sediment filter may include a generally circular disk and the sediment filter surface may include a plane bounded by a circle. As another feature, the cylindrical filters may be positioned in in a concentric ring.

A first channel and a second channel may fluidly connect the sediment filter to the more cylindrical filters. The first channel can have a central axis that is orthogonal to a central axis to the more than one cylindrical filter. A central axis of the second channel may be in a direction along the length of the more than one cylindrical filter.

At least one of the cylindrical filters may include an annular ring of activated carbon. The cylindrical filters may also include a plurality of pleated media filters configured in a concentric ring.

An outlet tube in the center of the concentric ring may include a wall that causes a water flow to change direction from a direction that is orthogonal to a central axis of the pleated media filters to a direction that is parallel to a central axis of the pleated media filters. The wall of the outlet tube may cause the water flow to change to the opposite direction of the direction that is parallel to the central axis of the pleated media filters to exit the filter assembly through an outlet.

In another general aspect, a filter assembly includes an inlet end, a sediment filter having a sediment filtering surface facing the inlet end. The sediment filter includes a generally circular disk, cylindrical filters in a concentric ring, a channel to fluidly connect the sediment filter to the cylindrical filters, an outlet tube in the center of the concentric ring. The outlet tube includes a wall that causes a water flow to change direction from a direction that is orthogonal to a central axis of the cylindrical filters to a direction that is parallel to a central axis of the cylindrical filters in the direction of the sediment filter and to reverse direction away from the sediment filter to reach an outlet at the end of the outlet tube.

Embodiments may include one or more of the above or following features. For example, the sediment filter surface may be orthogonal to each cylindrical filtering surface of the cylindrical filters.

The cylindrical filters include an annular ring of activated carbon and/or ion exchange resin and a plurality of corrugated media filters configured in a concentric ring inside the annular ring of activated carbon.

In still another general aspect, the filter assembly includes a circular intake cover to receive a flow of water from a container, a cylindrical wall attached to the circular intake cover, an inner ported circular wall within the cylindrical wall that divides the volume within the cylindrical wall into a sediment filter chamber and a cylindrical filter chamber, a sediment filter in the sediment filter chamber, cylindrical filters in a concentric ring in the cylindrical filter chamber, a cover wall in the cylindrical filter chamber that causes a flow of water from the sediment filter to change to a lateral direction toward the outside of the concentric ring, and a circular outlet tube inside the concentric ring of cylindrical filters that forces a water flow to change direction upward toward the sediment filter and then down again through an outlet port into an outlet chamber. Embodiments may include one or more of the above features.

In a further general aspect, a filter system includes a first filter, second and third filter with overlapping ranges of pore sizes. The first, second and third filter each include a fibrous layer having a first and second filter surface and a pair of surface layers sandwiching the first and second filter surface of the fibrous layer. The surface layers comprise a higher density than the fibrous layer. The surface layers of the first, second and third layers each include a first, second and third range of pore sizes, respectively. The second range of pore sizes is smaller than but overlaps with the first range of pore sizes and the third range of pore sizes is smaller than but overlaps with the second range of pore sizes.

Embodiments may include one or more of the following features. For example, the fibrous layer and the surface layers of the first, second and third filter may include edges that are bonded together. In another embodiment, surfaces of the fibrous layer and the surface layers are bonded together.

The fibrous layer of the first, second and third filter may include a web of entangled fibers configured as a three-dimensional layer and it may also have a substantially greater depth than the depth of the pair of surface layers.

The fibrous layer of the first, second and third filter may include polyethylene terephthalate, polypropylene, polyethylene terephthalate. The fibrous layers may also include a highly entangled fiber structure and/or a crystalline structure, such as, for example, pseudoboehmite.

The range of pore sizes of the second filter may be smaller than the range of pores sizes of the first filter by adding additional surface layers to the second filter and the range of pore sizes of the third filter may be smaller than the range of pores sizes of the second filter by adding additional surface layers to the third filter.

In another general aspect, a sediment filter system includes a series of segment layers each having a fibrous layer sandwiched between outer layers, wherein each of the series of segment layers includes different ratios of the material comprising the fibrous layer as compared to the material comprising the outer layers. The fibrous layer has a low density relative to the outer layers and the segment layers with higher compositions of outer layers include additional sheets of outer layers thereby decreasing the range of pore sizes.

Embodiments may include one or more of the following features. For example, the series of segment layers may include a first segment layer with a composition of between 50-95% fibrous layer and 5-50% outer layers, a second segment layer with a composition of between 40-85% fibrous layer and 15-60% outer layers, and a third segment layer with a composition of between 0-75% fibrous layer and 25-100% outer layers.

The series of segment layers may also include a first segment layer with a composition of 75% PET and 25% PP, a second segment layer with a composition of 55% PET and 45% PP, a third segment layer with a composition of 25% PET and 75% PP, and a fourth segment layer with a composition of 100% PP.

The outer layers may include polypropylene (PP) and the fibrous layer may include polyethylene terephthalate (PET). The low-density fibrous layers may be configured as a three-dimensional structure that allow dust particles to move through the fibrous layers in a circuitous direction. The circuitous path of dust particles through the fibrous layers can increase the dust particle storage capacity of the fibrous layers.

DETAILED DESCRIPTION OF THE INVENTION

Figure 1:
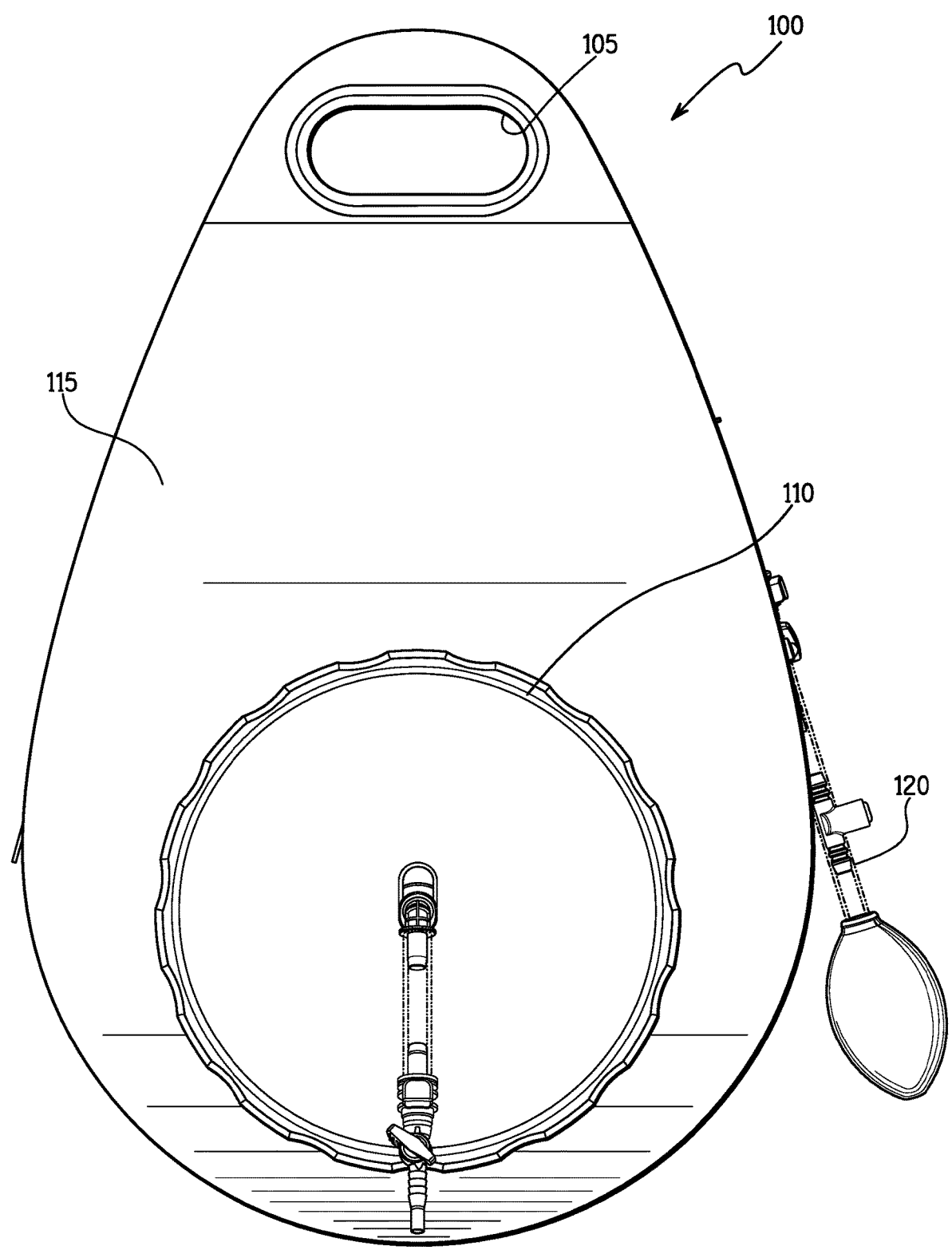
FIGS. 1-6 illustrate a portable water filtration system according to an embodiment of the present invention.
Figure 2:
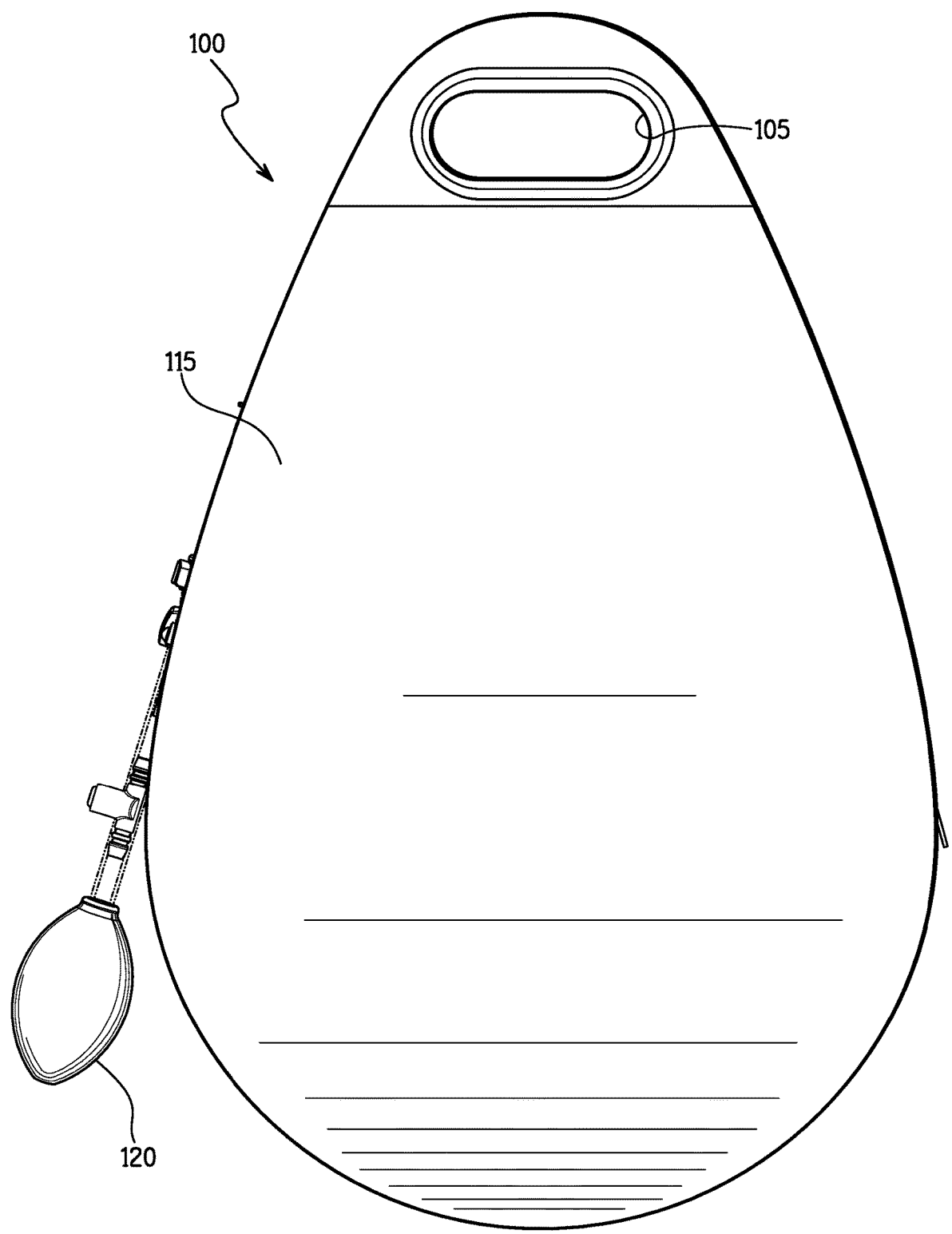

Referring to FIGS. 1-6, a portable water filtration system 100 can be used in areas where potable water systems are not available. The system 100 includes a handle 105, a filter assembly 110 and a container vessel 115 that holds a volume of water. A pump 120 can be used to pressurize the vessel 115 to facilitate water flow through the filter assembly 110.

Figure 3:
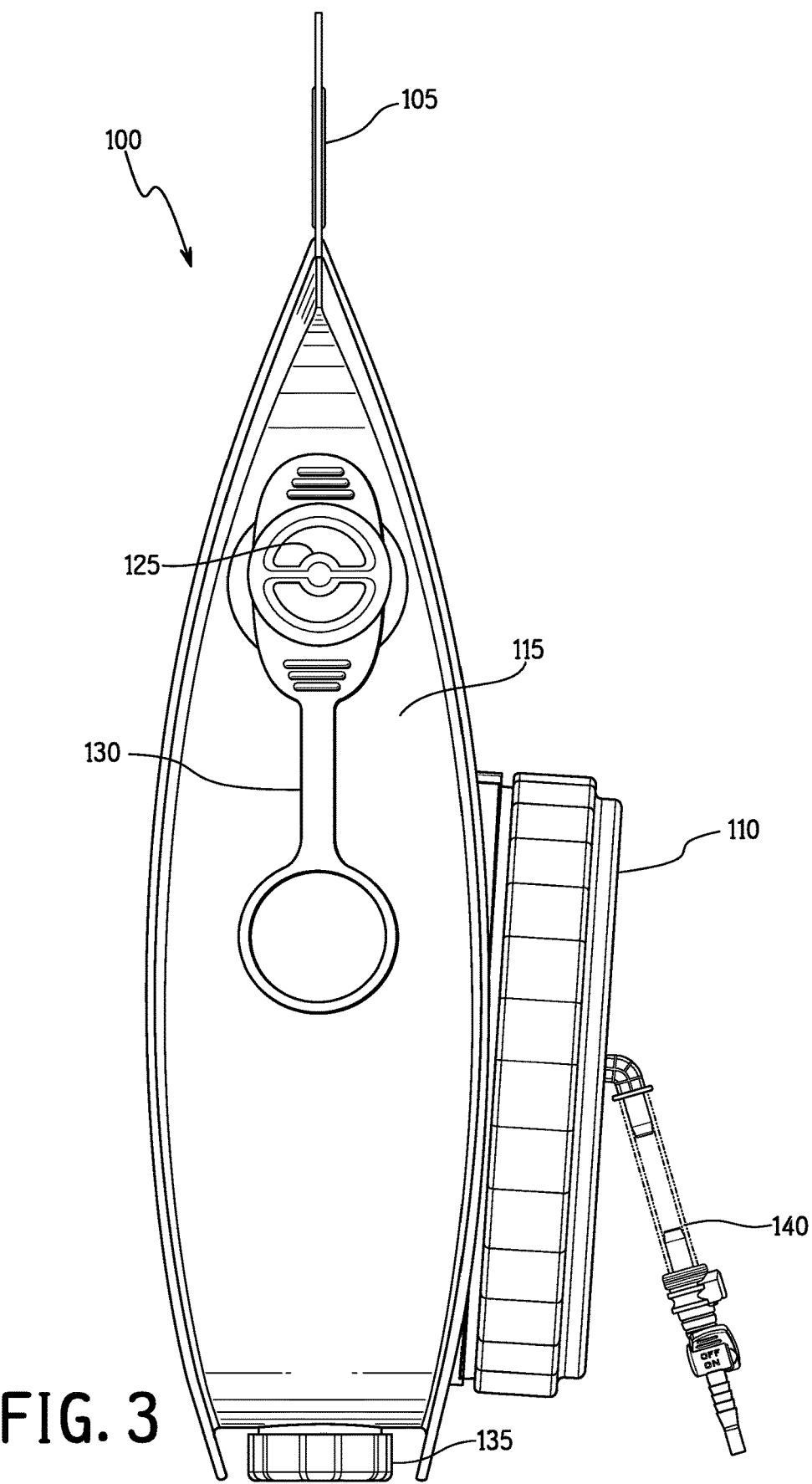

Referring to FIG. 3, the vessel 115 has a fill port that is covered by a cap 125. A retainer ring 130 is used to retain the cap 125. A sediment drain covered by a drain cap 135 is positioned at the bottom of the vessel 115. An outlet hose 140 is installed in an outlet of the filter assembly 110.

Figure 4:
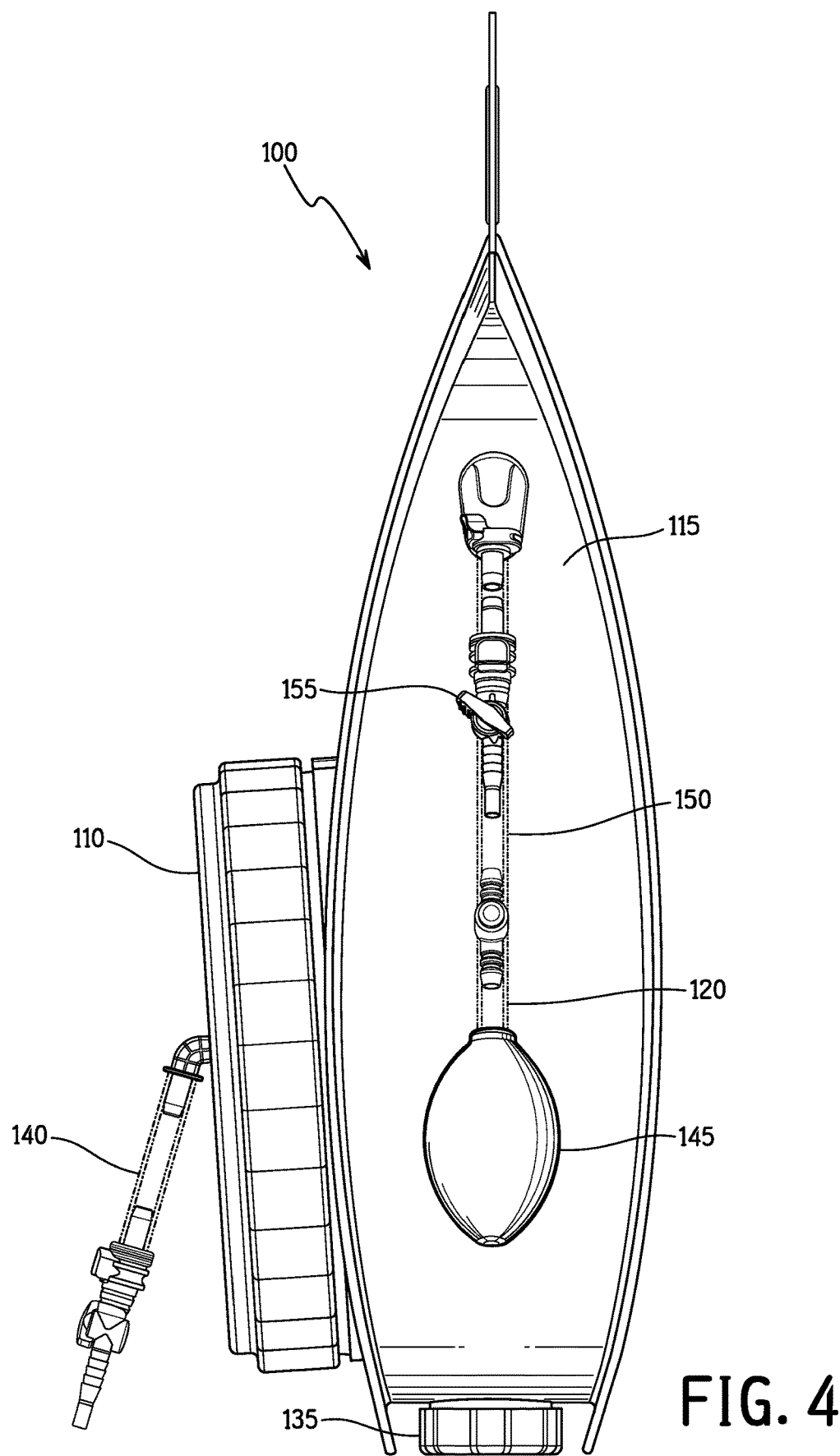
Figure 5:
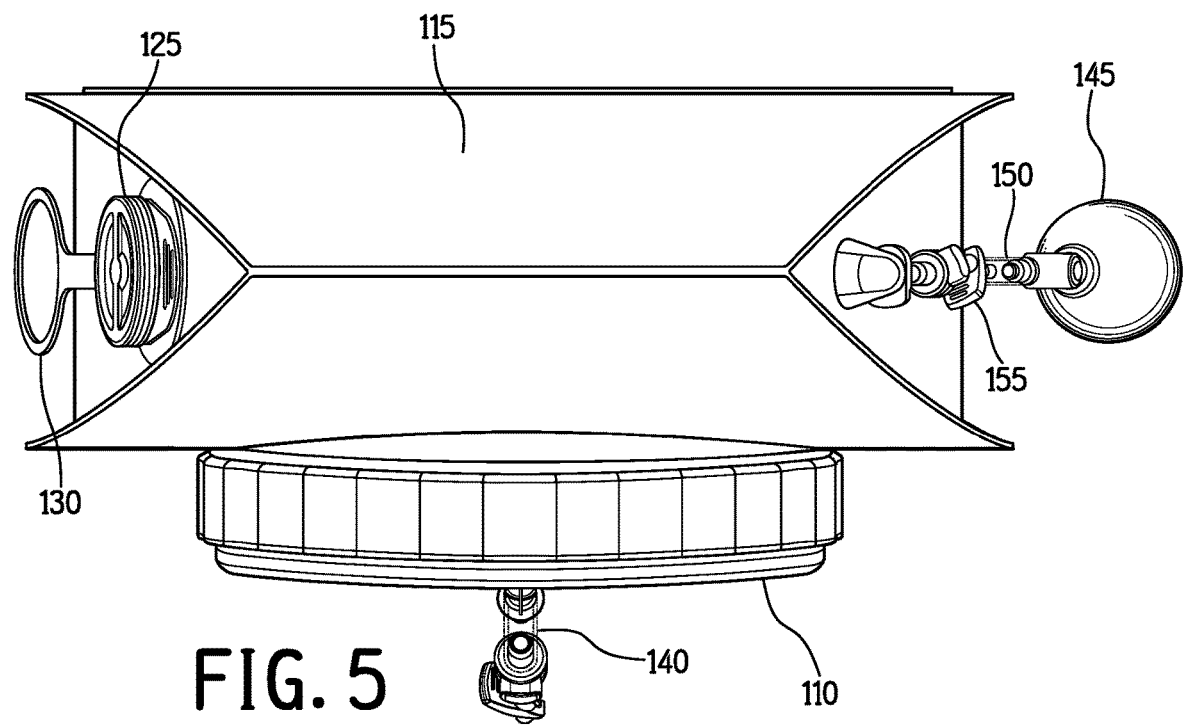
Figure 6:
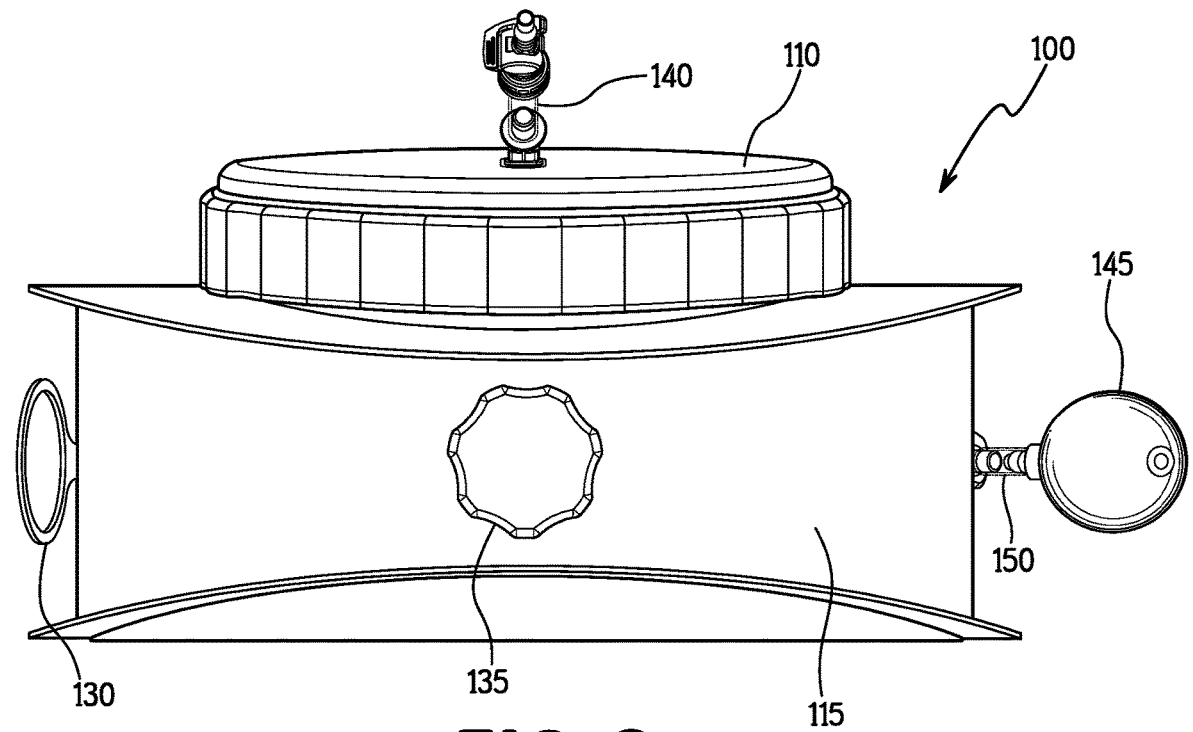

Referring to FIG. 4, the pump 120 includes a squeezable bulb 145, a pressure hose 150 and a valve actuated by a butterfly handle 155. The valve can seal the vessel 115 to maintain pressure.

Figure 7:
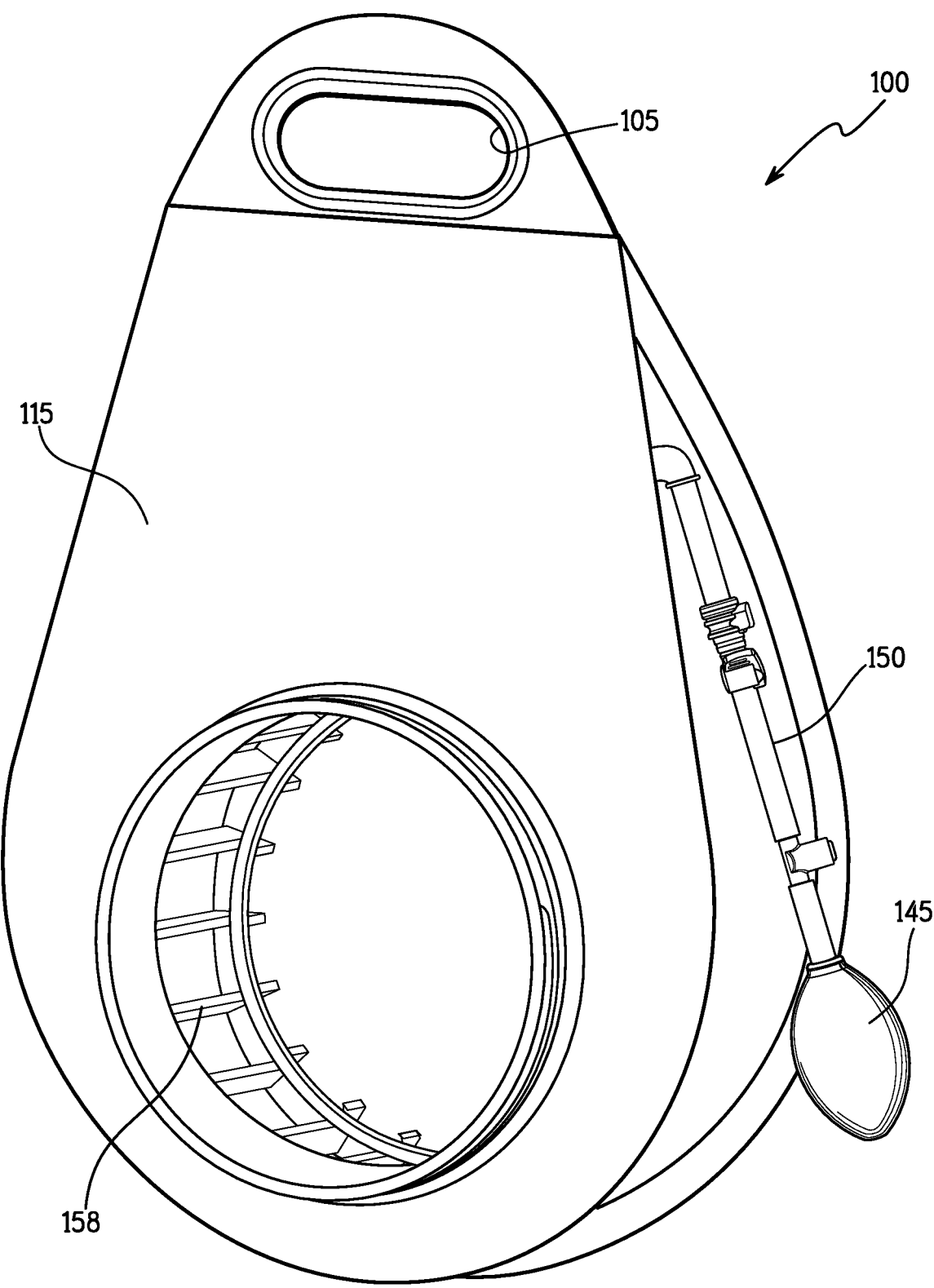
FIG. 7 shows a protective filter cage of the portable water filtration system.
Figure 14:
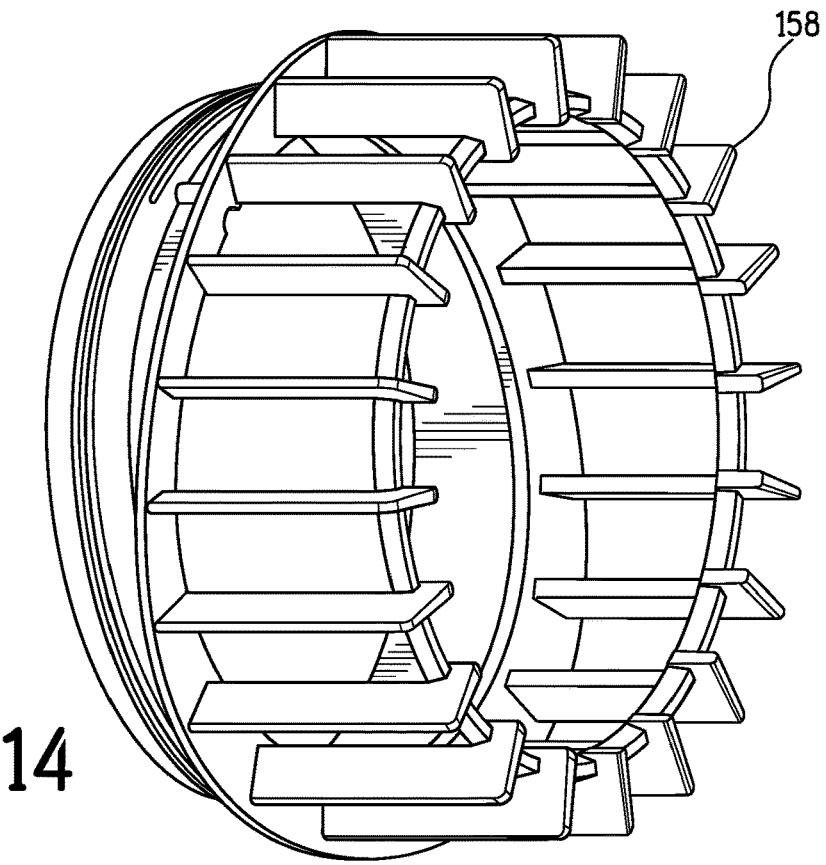
FIGS. 14 and 15 illustrate perspective and cross-sectional views of a protective filter cage of the water filter assembly.
Figure 15:
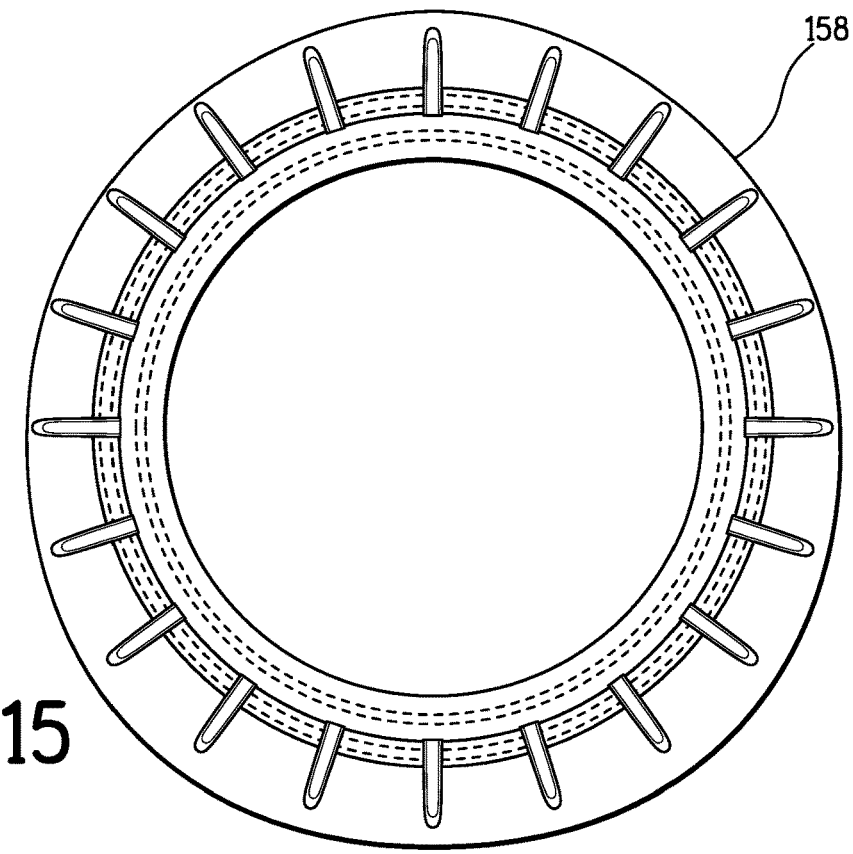
Figure 16:
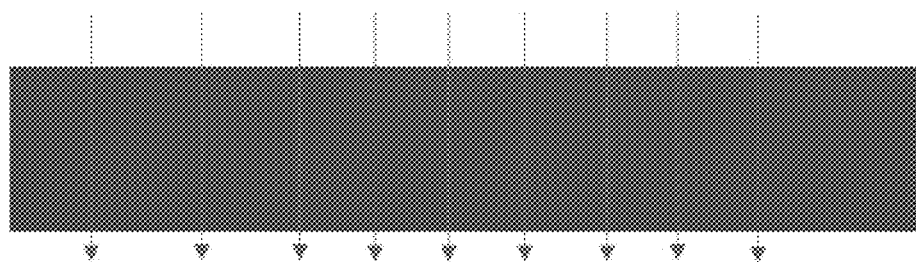
FIG. 16 illustrates a cross-sectional view of a conventional filter.
Figure 17:
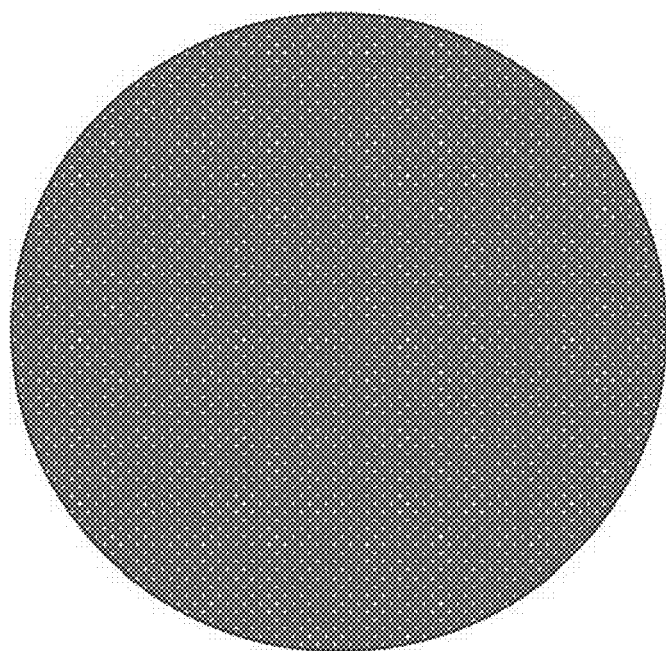
FIGS. 17 and 18 show surface views of a conventional filter.
Figure 18:
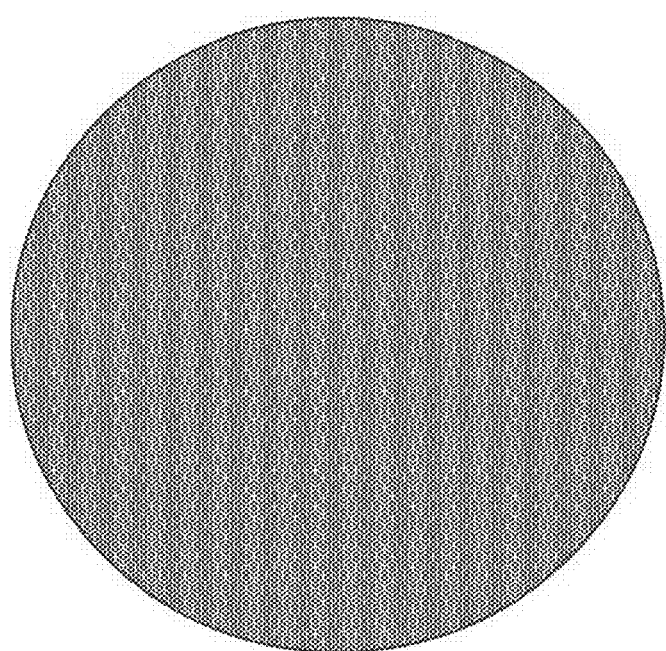

Referring to FIGS. 7, 14 and 15, a protective cage 158 surrounds the filter assembly (not shown). The cage 158 includes a series of ribs that encircle the filter assembly. This protects the filter assembly against impact, such as, for example, if the container 100 is dropped.

Figure 8:
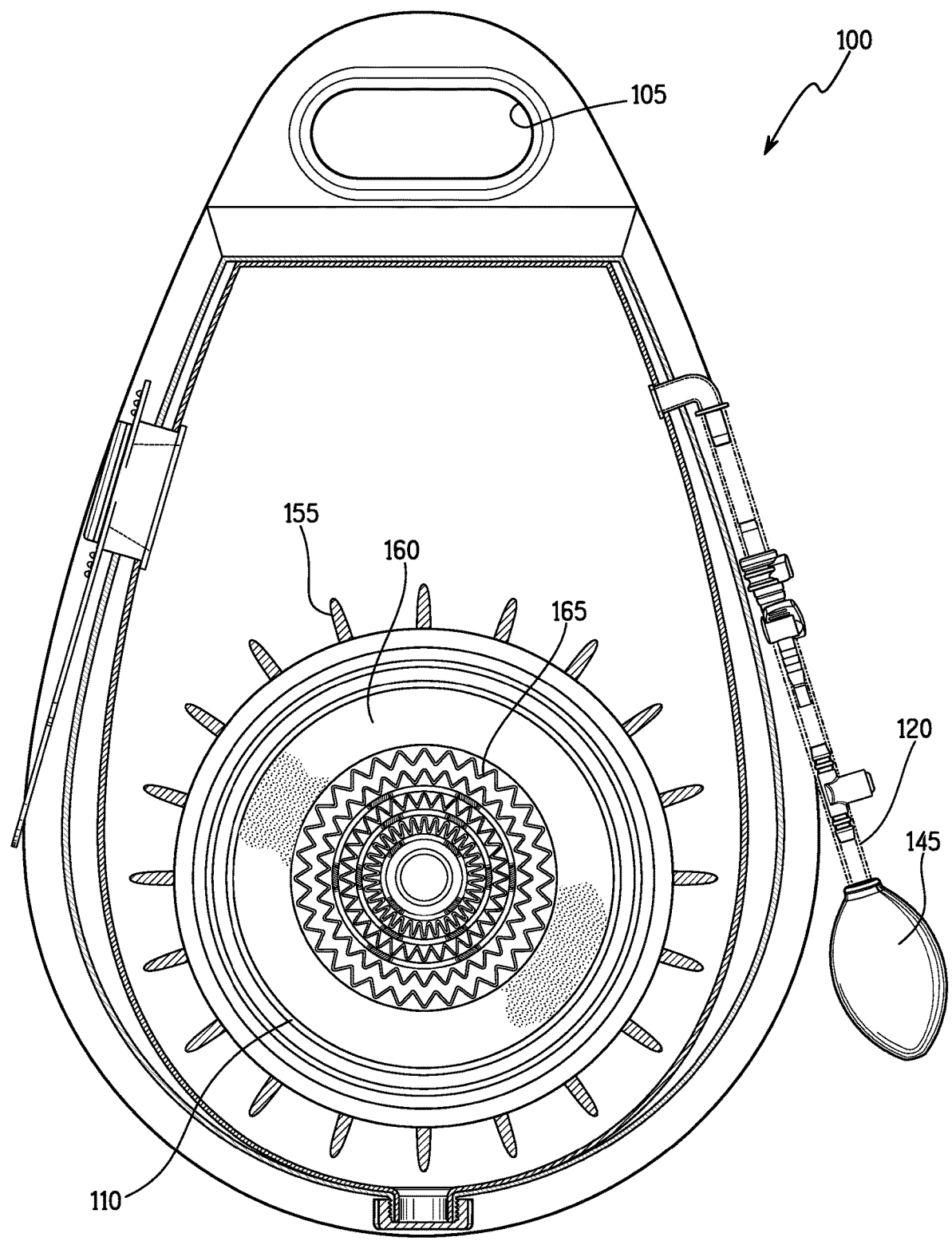
FIGS. 8 and 9 illustrate partial cross-sectional views of the portable water filtration system.

Referring to FIG. 8, the filter assembly 110 include a carbon ring 160 and a series of corrugated filters 165 in a concentric ring. As will be described in more detail below, water flows from the outside to the inside of the concentric ring of filters to an exit port.

Figure 9:
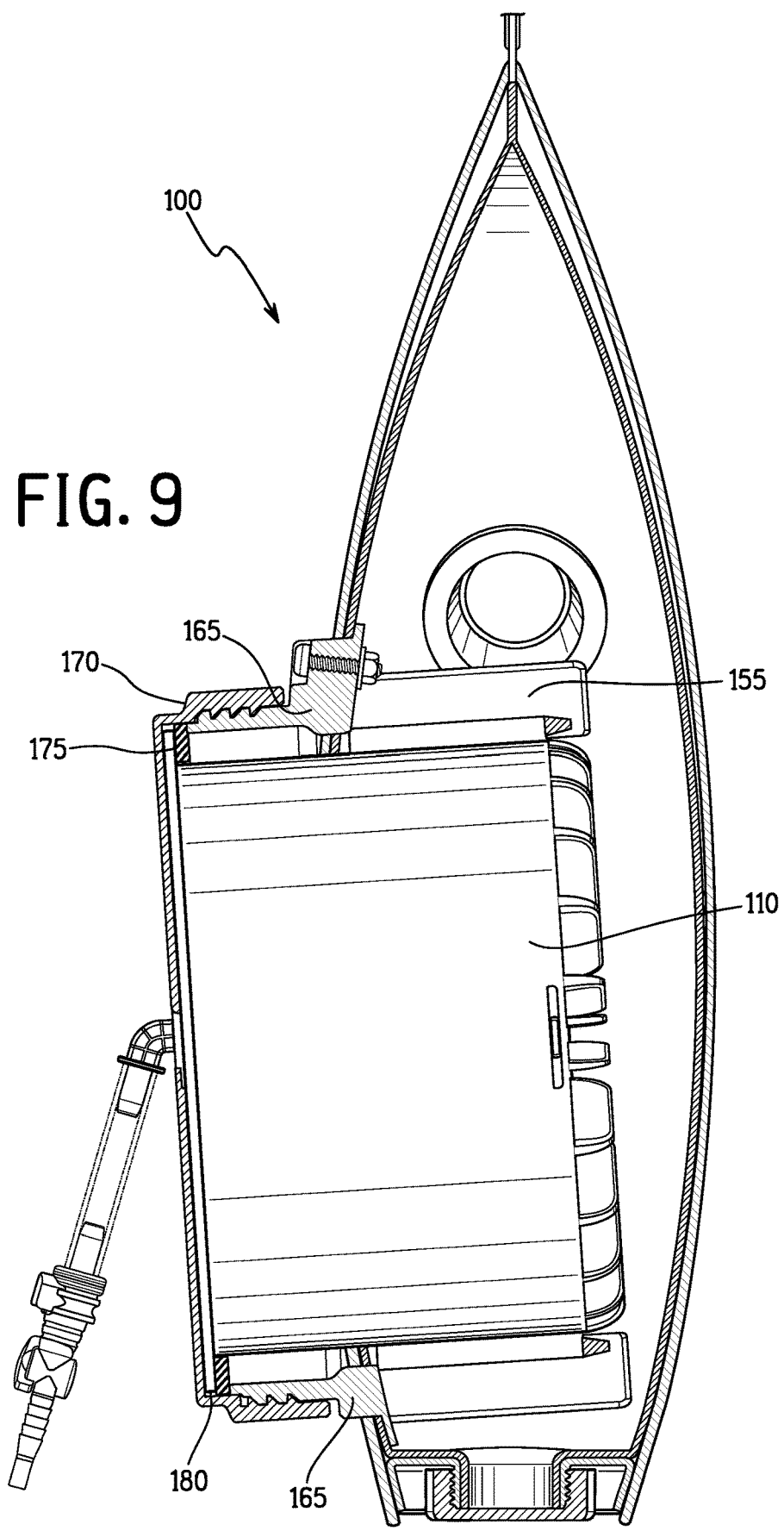

Referring to FIG. 9, the filter assembly 110 is positioned in a threaded collar 165 attached to the container 110. A threaded cap 170 is screwed into the threaded collar 165 to secure the filter assembly 110 in the container 110. A sealing ring 175 or gasket is positioned between the threaded cap and a lip 180 of the filter assembly 110 so that the filter assembly is clamped between the threaded collar 165 and the threaded cap 170 for a watertight seal.

Figure 10:
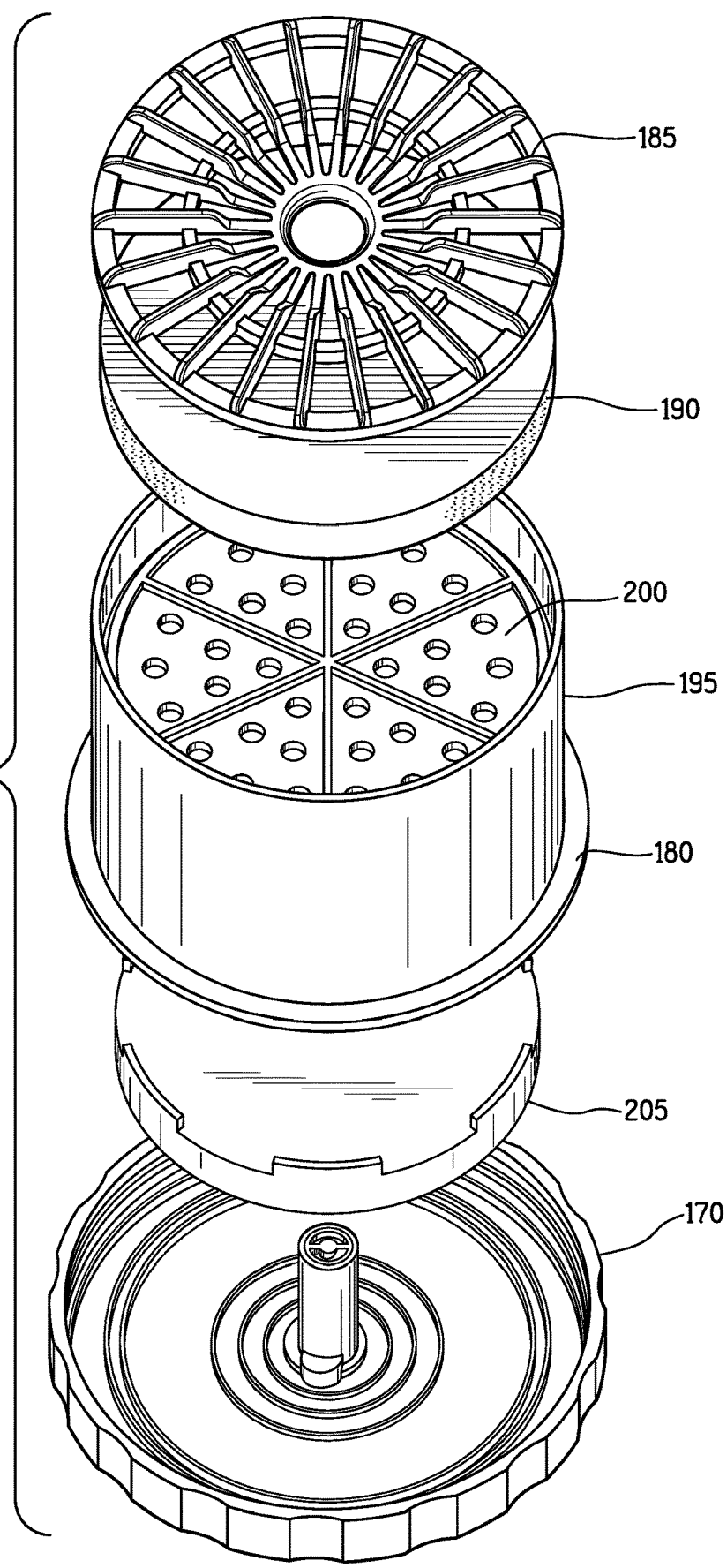
FIG. 10 shows an exploded view of a water filter assembly according to an embodiment of the present invention.
Figure 11:
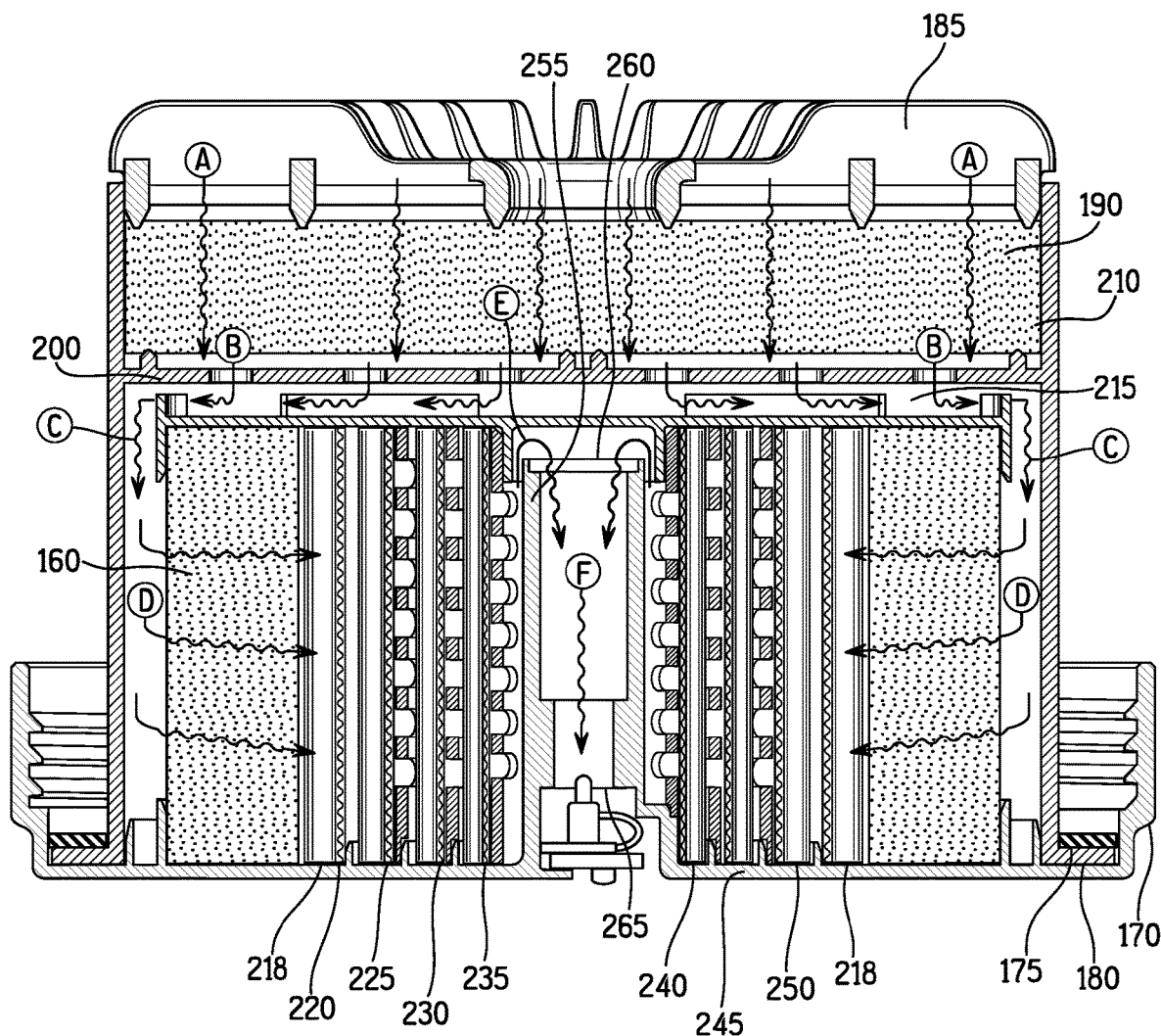
FIG. 11 shows a cross-sectional view of the water filter assembly.

Referring to FIGS. 10 and 11, the filter assembly 110 includes a circular intake cover 185, a sediment filter 190, a generally cylindrical wall 195, an inner circular wall 200 and a cover wall 205 over the concentric filters. The circular intake cover 185 has a series of ribs and openings that allow water to flow from the vessel 115 into the filter assembly 110. The inner circular wall 200 separates the filter assembly into a sediment filter chamber 210 and a concentric ring filter chamber 215. The inner circular wall 200 has a series of ports to allow water to flow from the sediment filter chamber 210 to the concentric ring filter chamber 215.

The generally cylindrical wall 195 may have straight or parallel sides and a circular or oval cross-section in the shape or form of a cylinder. However, it may have other rectangular shafts or notches.

The sediment filter 190 is positioned in a vertical orientation with respect to the height of the vessel 115. Thus, heavy sediment bypasses the sediment filter 190 and falls directly to the sediment drain thereby extending the life of the sediment filter 190.

Referring to FIG. 11, water flows through the intake cover 185 from the vessel 115 into the sediment filter chamber 210 in the direction shown by Arrow A. Water then flows from the sediment filter chamber to the concentric ring filter chamber 215. The cover wall 205 over the concentric filters is a solid circular wall that diverts the flow of water from a downward to a lateral direction toward the outside of the concentric ring filter chamber 215 as shown by Arrow B. The water then flows downward between the cylindrical wall 195 and the outside surface of the carbon ring 160 in the direction of Arrow C. The carbon ring 160 includes activated carbon and may be a composition of materials, such as, for example, carbon with embedded silver. Other types of filter media may be used instead of or in addition to carbon, such as, for example, an ion-exchange resin or ion-exchange polymer.

Water flows through the carbon ring 190 from the outside to the inside in the direction of Arrow D. Water then flows through a dividing wall 218 into the concentric ring of corrugated filters 165.

The embodiment shown in FIG. 11 has a series of four corrugated filters 220, 225, 230 and 235. The filters 220, 225, 230 and 235 are spaced apart by dividing walls 240, 245, and 250.

Figure 12:
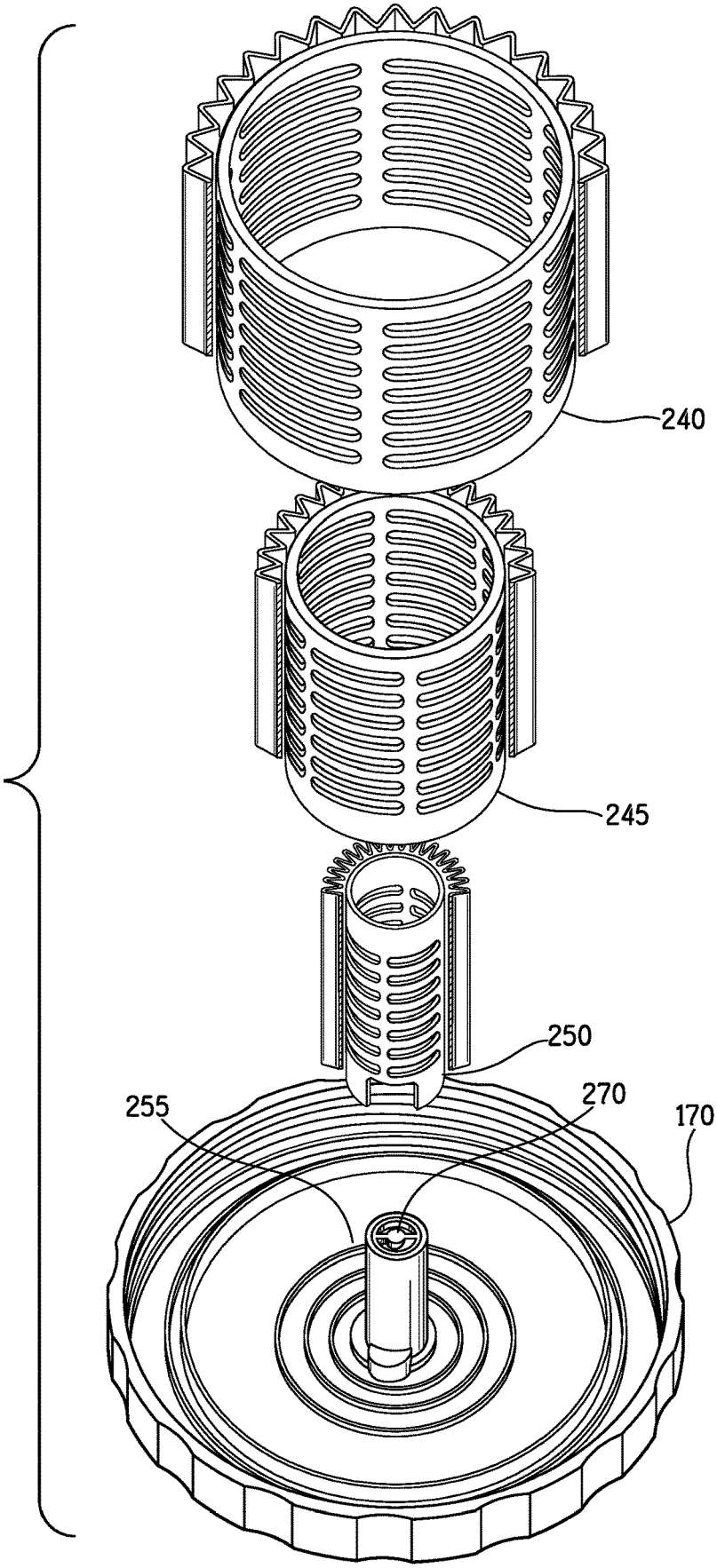
FIG. 12 is an exploded view of concentric filters of the water filter assembly.

As shown in FIG. 12, each of the dividing walls 218, 240, 245, and 250 has ports or slots that allow the flow of water toward the center of the concentric rings. A circular outlet tube 255 is positioned at the center of the dividing walls 218, 240, 245, and 250. In other embodiments, additional dividing walls may be added or dividing walls may not be used. One or more of the concentric filters 220, 225, 230 and 235 may be configured to remove suspended matter, microbiological matter and/or chemicals.

Referring again to FIG. 11, a circular outlet tube 255 forces the water to change direction upward toward the sediment filter 190 and then down again through an outlet port 260 into an outlet chamber as shown by Arrow E. Water then flows down toward an exit port 265 in a direction to exit the container 100 as shown by Arrow F.

Figure 13:
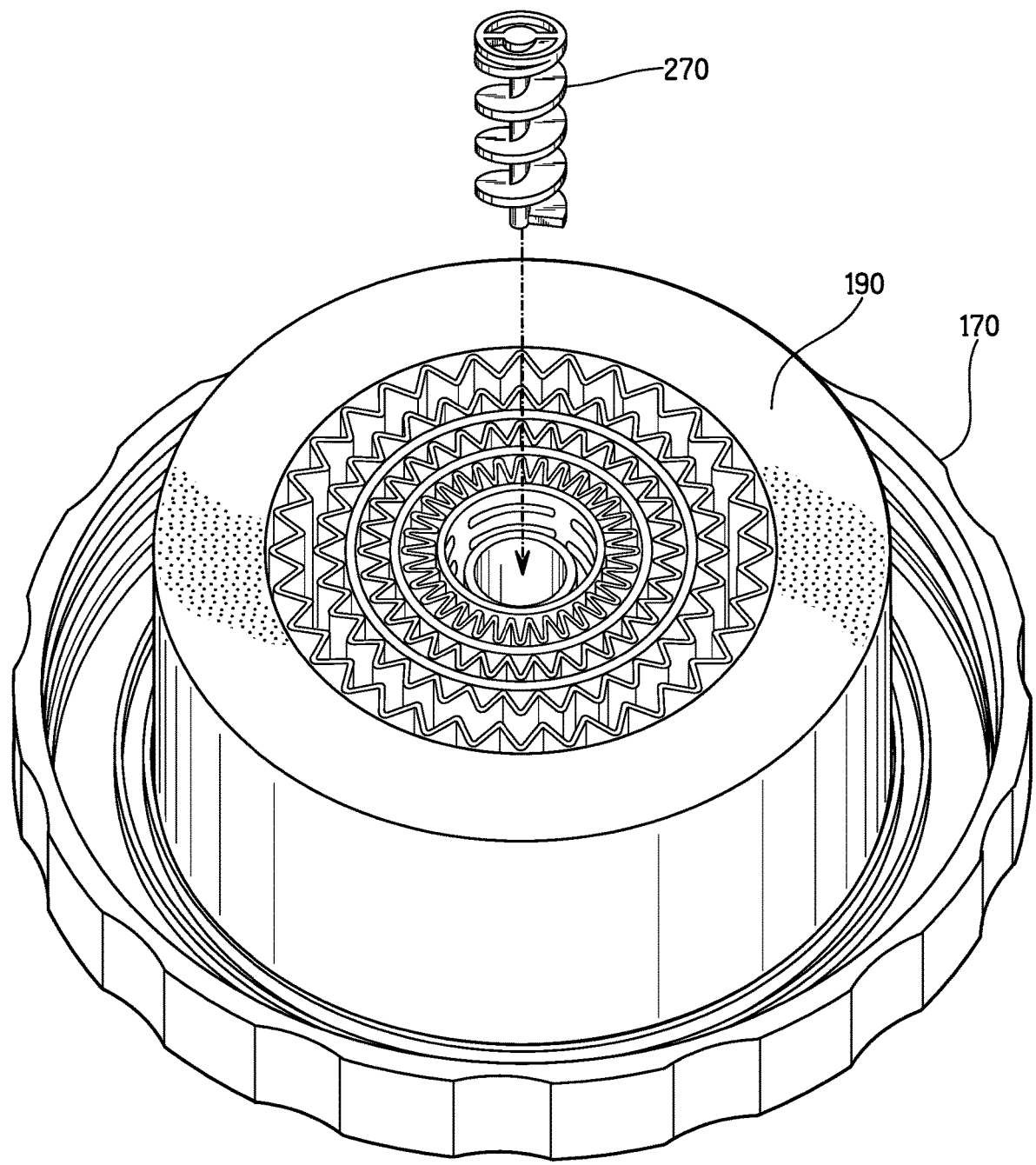
FIG. 13 is a perspective view of the water filter assembly.

Referring to FIG. 13, a spiral flow agitator component 270 is positioned in the circular outlet tube 255. The agitator component 270 causes turbulence so that water has increased contact with a disinfectant media in the outlet tube 255. In another embodiment, the agitator component may also include disinfection media.

Figure 19:
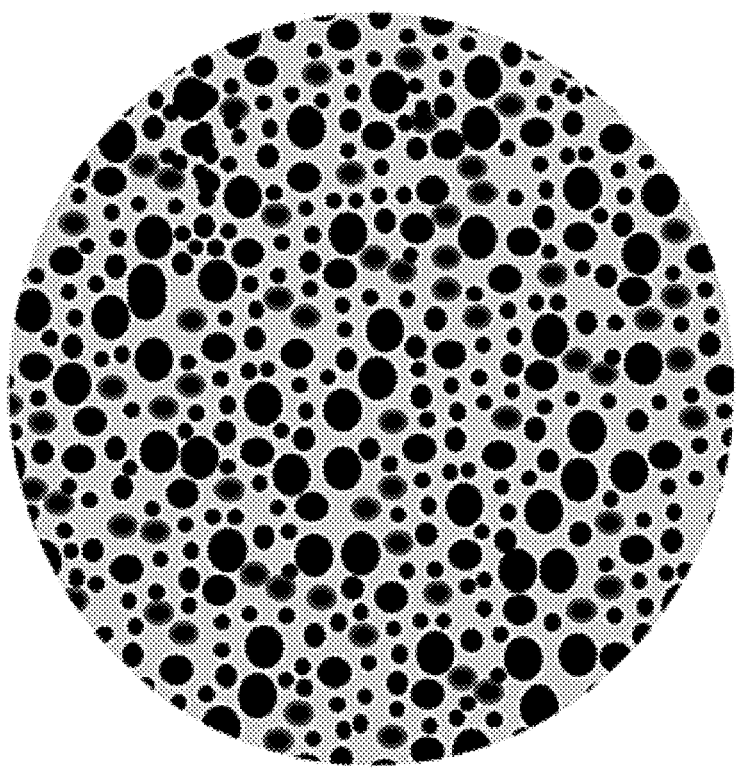
FIGS. 19 and 20 illustrate surface views of a sediment filter according to an embodiment of the present invention.
Figure 20:
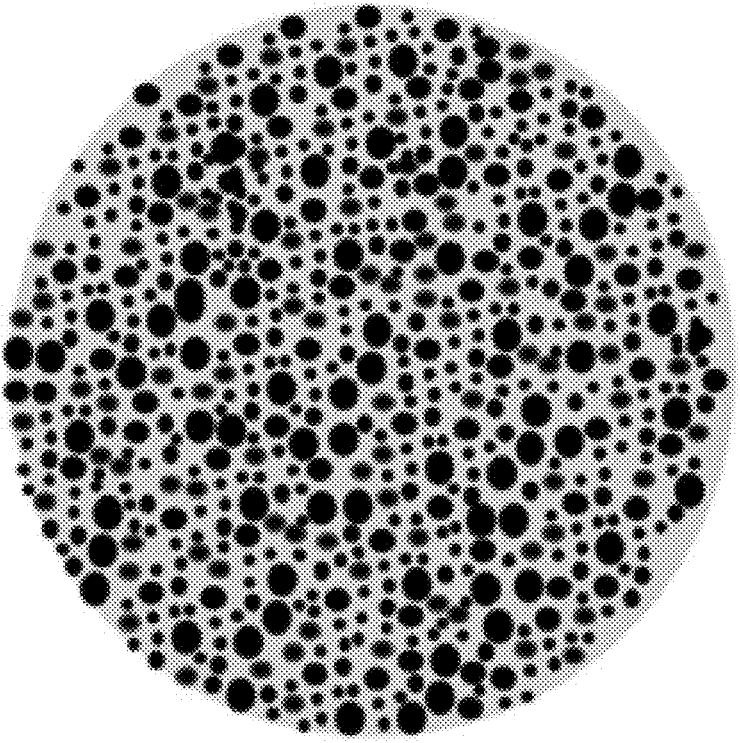

Referring to FIGS. 19 and 20, the filter material is designed with a larger range of pore sizes than that of a conventional filter. The range of pore sizes shown in FIG. 19 are generally larger than that shown in FIG. 20, however, the range of pore sizes can overlap.

Figure 21:
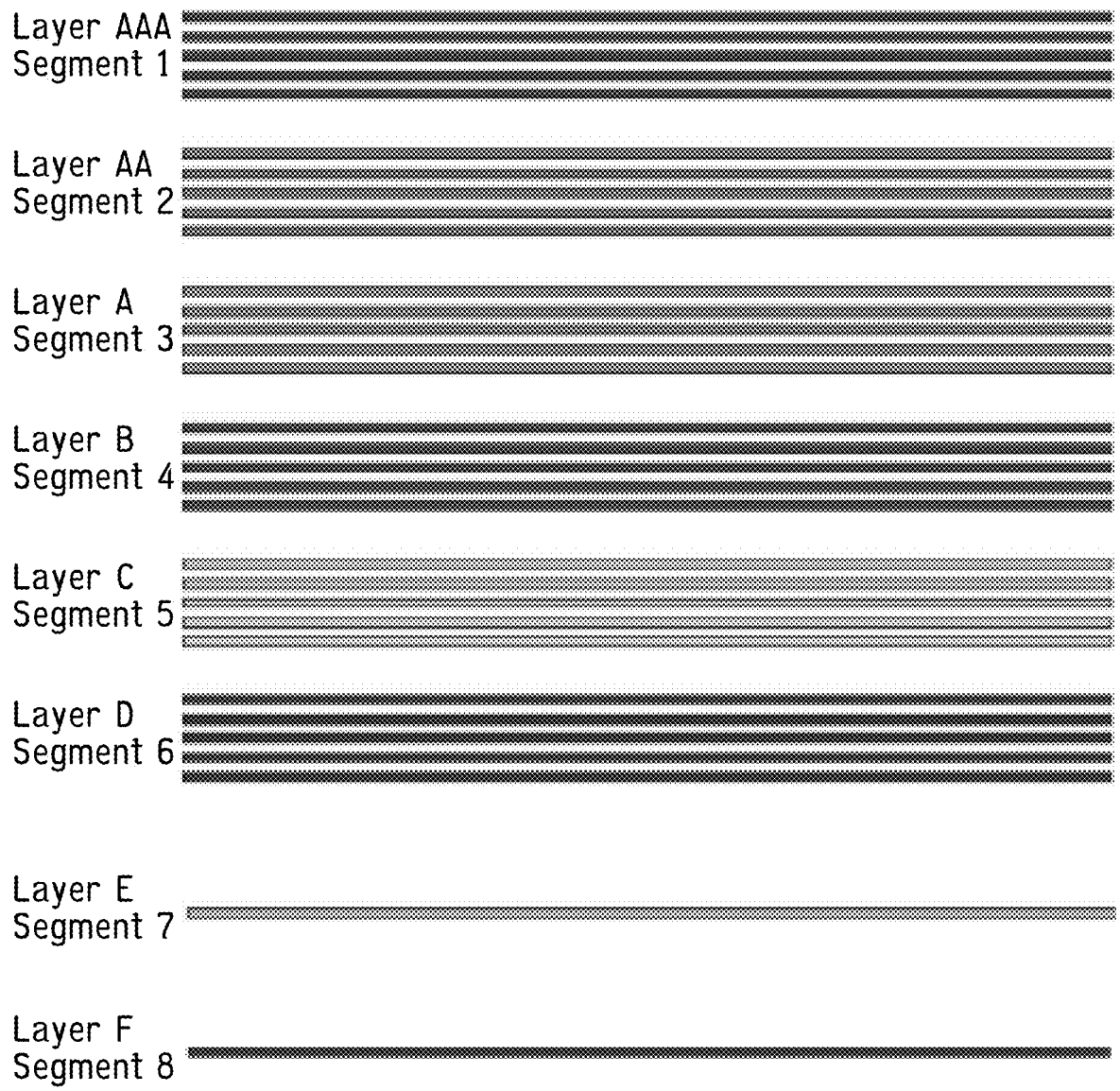
FIGS. 21-23 show segment layers of the sediment filter.

FIG. 21 shows various filter media segment layers that make up the sediment filter. Generally, the range of pore sizes of the surface material making up each filter segment layer AAA, AA, A, B, C, D, E and F generally get smaller. In one embodiment, some of the segment layers AA, A, B, C, E and F are made up of varying amounts of a first surface material sandwiching a second filter material.

The range of pore sizes of the first surface material can be adjusted by adding or subtracting various layers of a filter media together, such as, for example, layers of a melt blown polypropylene (PP) web. The degree of fiber-entanglement, fiber diameter and density of the melt blown web can also be used to vary effective pore sizes of the PP. In another embodiment, spunbond fabric may be used in addition to or to replace the PP when, for example, additional strength is needed.

In the embodiment that is shown in FIG. 21, segment layers AAA, AA, A, B, C and D include four individual layers that make up each of the segment layers. In different embodiments the four individual layers may have surfaces that are bonded to each other to make up the segment layer or they may be stacked on each other so that they contact adjacent individual layers without being bonded together. In another embodiment, the surfaces of the individual layers are tacked to adjacent individual layers in discrete locations such as in the center of each layer and at the edges.

Figure 22:
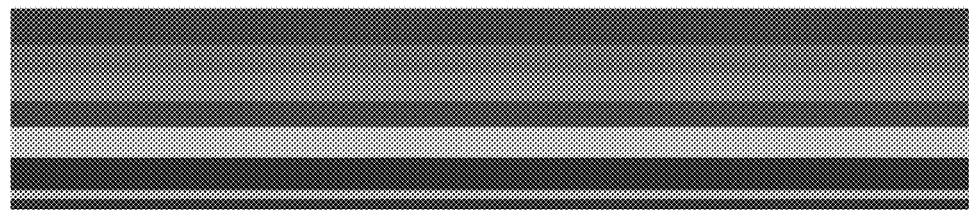
Figure 23:
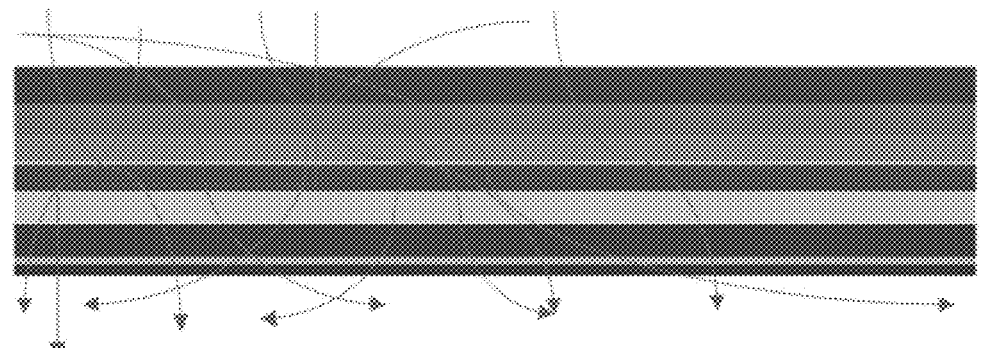

Referring to FIGS. 22-23, the filter media segment layers AAA, AA, A, B, C, D, E and F are stacked together. Each segment AAA, AA, A, B, C, D, E and F is in contact with adjacent segment layers, but the surfaces of the segment layers are not bonded together.

Figure 24:
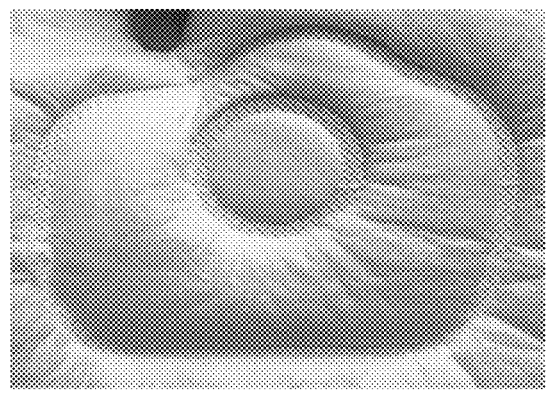
FIGS. 24 and 25 show surface and cross-sectional views of the sediment filter.

Referring to FIG. 24, the filter media segment layers are stacked and cut together in a desired shape. For example, the segment layers may be stacked, and an ultrasonic cutter may be used. A seal or bond at the edges of the segment layers may be formed during the cutting process. In other process, a form of heat welding may be used to bond the segment edges together.

Figure 25:
Figure 26:
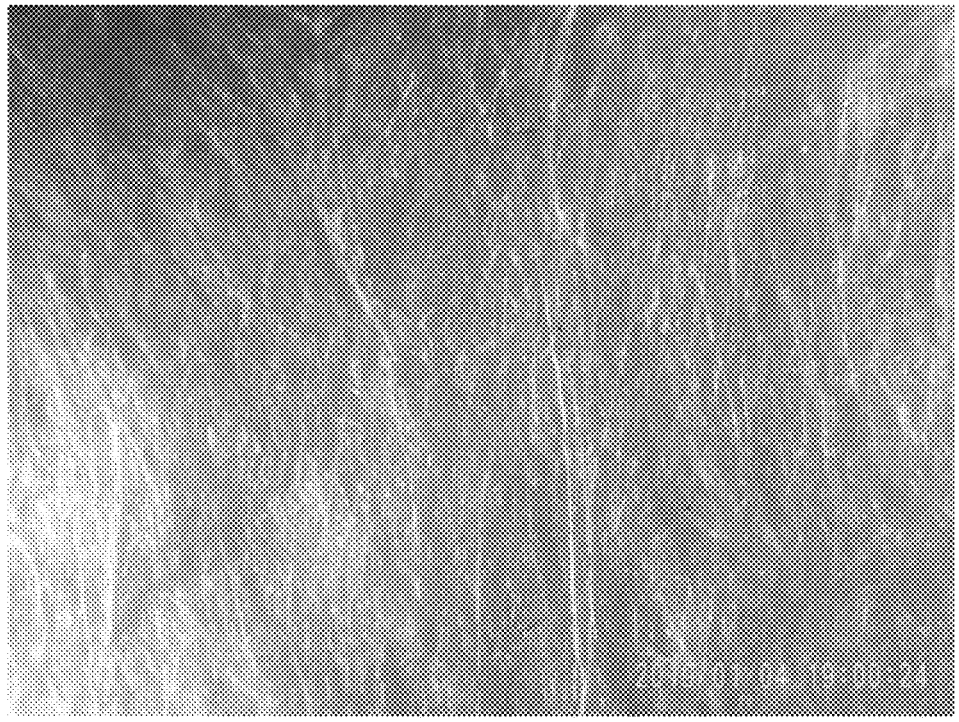
FIGS. 26-28 illustrate surface, cut-away and full stack profile views of segment layers AA, A, B, C and D of the sediment filter.
Figure 27:
Figure 28:
Figure 29:
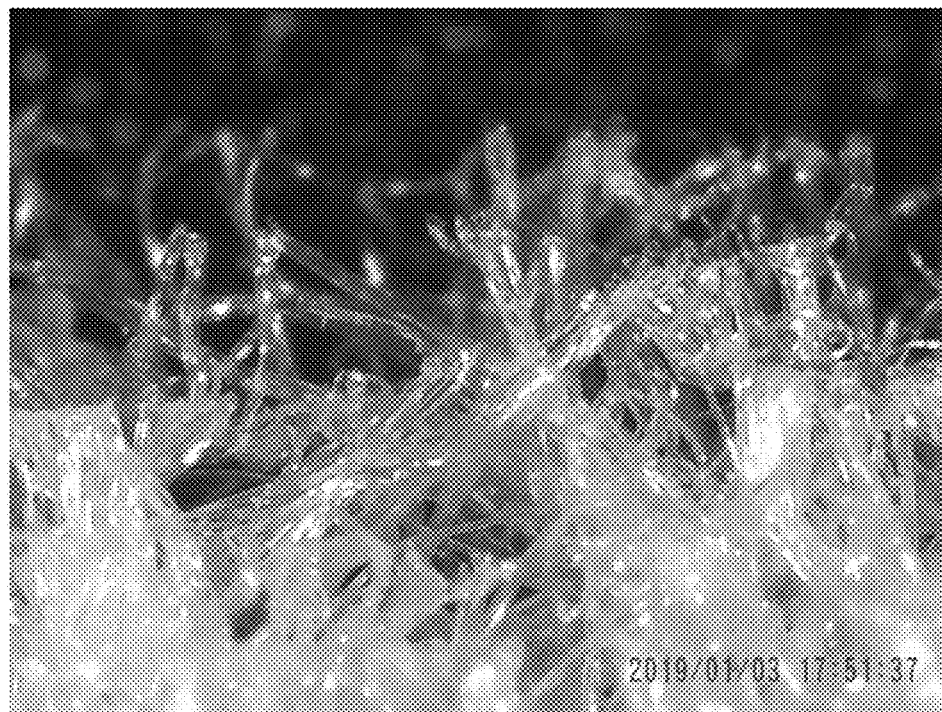
FIGS. 29-33 show cross-section, layered surface, single layer surface, profile and stack profile views of segment layer AAA of the sediment filter.
Figure 30:
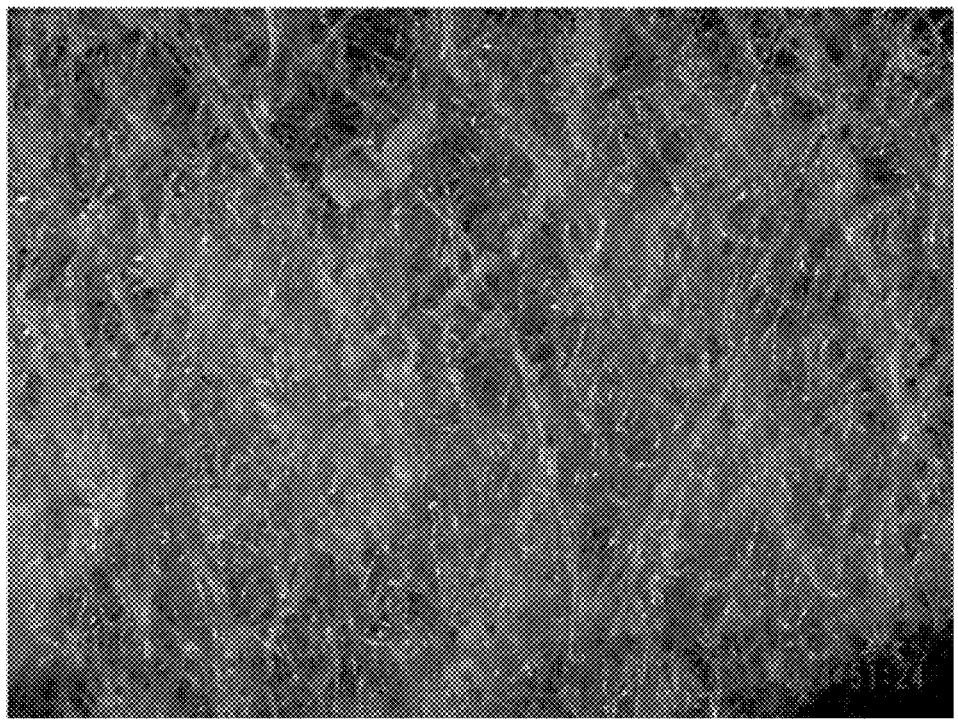
Figure 31:
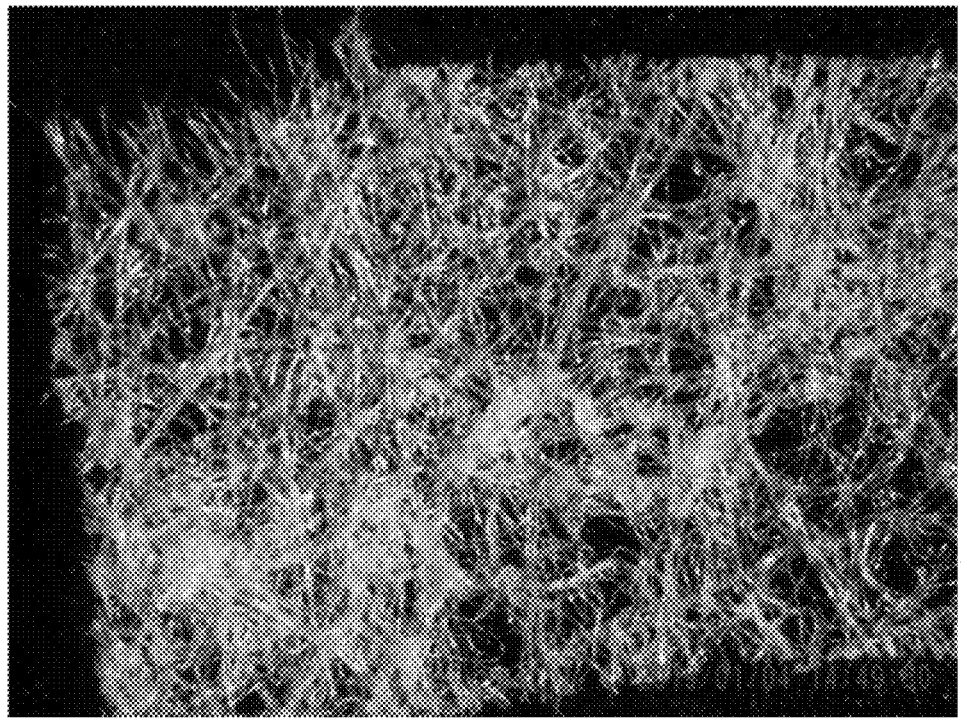
Figure 32:
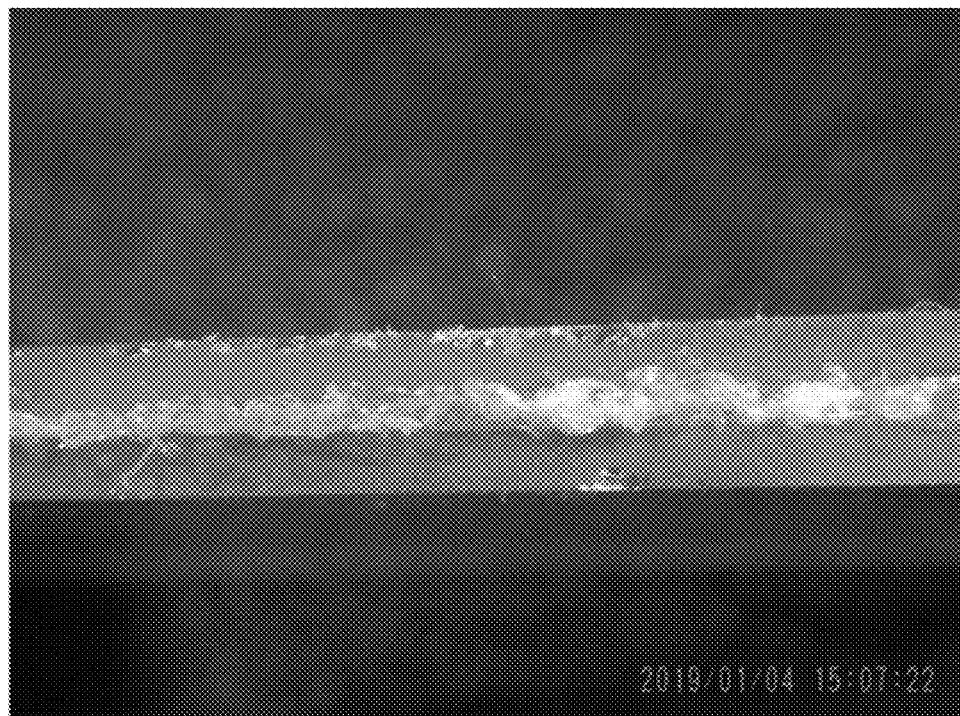
Figure 33:
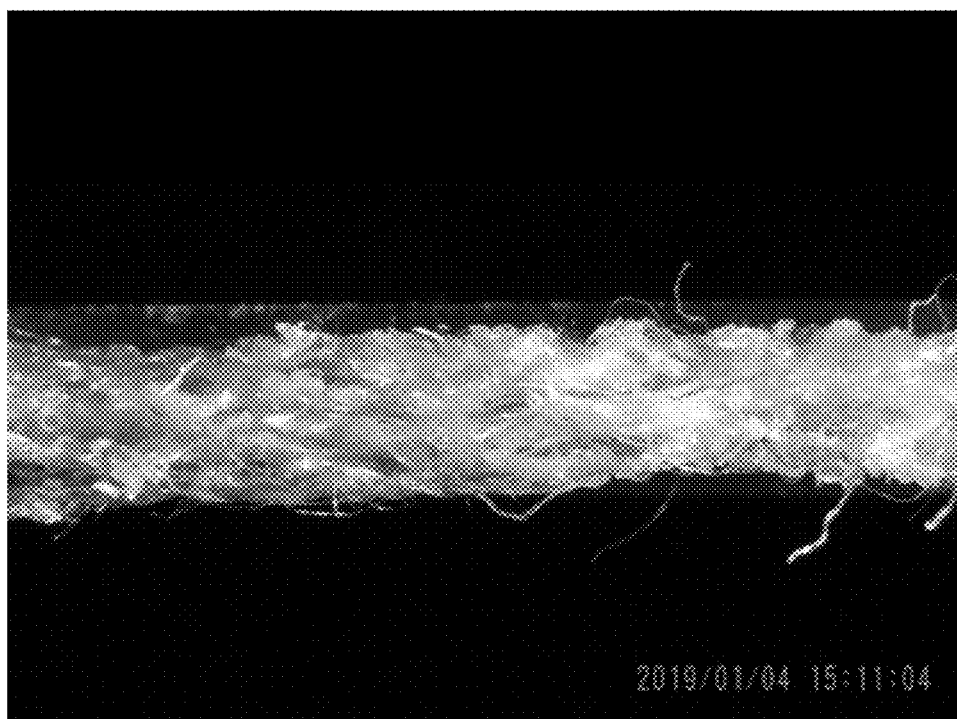

Referring to FIG. 25, the edges of the segment layers can be clamped or bonded together with a plastic ring or silicone over molding to form the sediment filter. As shown, the sediment filter can be much denser at the edges while the center bulges outward at the top, bottom or both the top and bottom.

Referring to FIGS. 29-33 the media filter segment layer AAA is shown in more detail with a multiple layer surface view, single layer surface view and a profile view. Each profile view is a from the side with the filter media sandwiched between glass slides for illustration purposes only. Segment layer AAA is formed from multiple layers of PP that are bonded together. In one embodiment, four individual layers make up one segment layer AAA which is 100% PP with a density of 20-70 grams per square meter (GSM).

Referring to FIGS. 26-28 and 45, the segment layers AA, A, B and C are illustrated by surface, cut-away, full stack profile and single layer profile views. The term full stack profile refers to the combinational of individual layers that make up the segment layer and single layer profile refers to an individual layer of the segment layer. The outer layers of each individual layer are formed from PP bonded to an inner layer formed from polyethylene terephthalate (PET) fibers. The outer PP layers dictate the range of pore sizes while the PET fibers provide a three-dimensional matrix of filter media with much less resistance to particle flow than the PP surface or outer layers. The PET fiber matrix allows sediment particles to travel in varying directions through the filter media as well as laterally. This provides a higher volume of particle loading in comparison to a filter with a more single directional flow through the filter media. The PET and PP fibers are bonded together to form each layer.

The segment layers have different compositions with decreasing pore sizes and sediment particle storage capacity. For example, in one embodiment segment layer AA includes a composition of 75% PET/25% PP, segment layer A includes a composition of 55% PET/45% PP, segment layer B includes a composition of 45% PET/55% PP, and segment layer C includes a composition of 25% PET/75% PP. Each segment layer AA, A, B and C may have a density of about 70 GSM.

Each of the segment layers AA, A, B and C can be composed of three or more layers of individual sandwich structures of PP layers on each side of PET fibers. The outer PP layers exhibit randomly distributed pore size structure across the surface of a sheet which also is a micro three-dimensional structure. This helps maintain flow rate and prevent pressure drop. The inner PET layer is composed of fibers which create a further three-dimensional structure to allow better dust loading capacity whilst maintaining randomly distributed pore sizes which again helps prevent pressure drop and premature clogging. The PET layer generally has a lower density and has much more porosity than the PP layer.

Multiple layers of the sandwich are stacked one on top of another to create a segment with more depth and hence more voids and more of a three-dimensional structure. These randomly distributed voids help to capture a range of particle sizes to prevent subsequent segment layers from clogging prematurely. Stacking of these layers helps create a more three-dimensional structure with multidirectional flow.

Segment layer AA is made from PET fibers sandwiched between layers of PP. This "sandwich" is more open than subsequent segment layers and exhibits a larger pore size structure in general than subsequent segment layers but has a smaller pore size than previous segment layers.

In one embodiment, segment layer AA can be composed of three or more individual sandwich structures. The outer layers of each sandwich are composed of melt blown polypropylene which exhibits randomly distributed pore size structure across the surface of a sheet which is which also a micro three-dimensional structure. This helps maintain flow rate and prevent pressure drop. The inner layer is composed of polyethylene terephthalate fibers which create a further three-dimensional structure to allow better dust loading capacity whilst maintaining randomly distributed pore sizes which again helps prevent pressure drop and premature clogging.

Multiple layers of the sandwich are stacked one on top of another to create a segment with more depth and hence more voids and more of a three-dimensional structure. These randomly distributed voids help to capture particle sizes to prevent subsequent segment layers from clogging prematurely. Stacking of these layers helps create a more three-dimensional structure with multidirectional flow.

Figure 34:
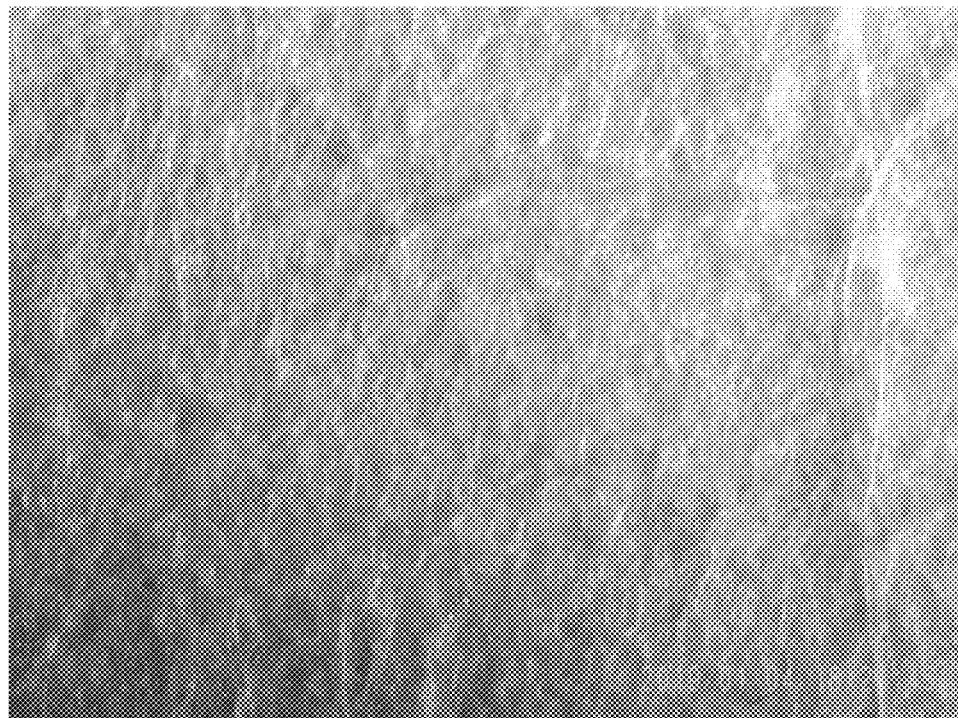
FIGS. 34-36 show surface, profile and stack profile views of segment layer D.
Figure 35:
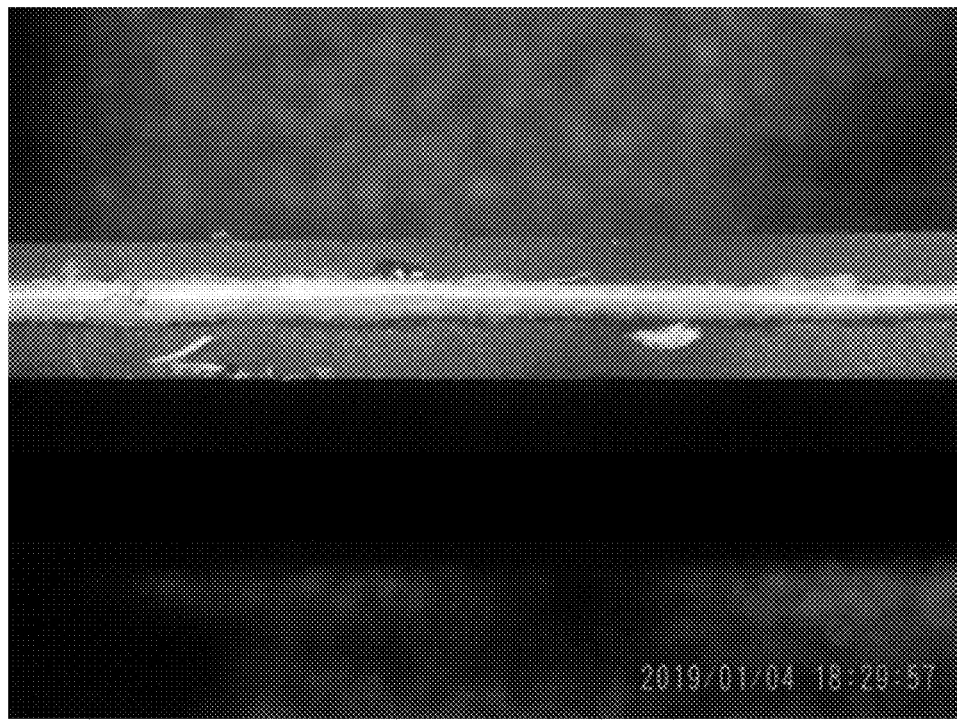
Figure 36:

Referring to FIGS. 34-36, segment layer D is illustrated by in profile, stack profile and surface views. In one embodiment, segment layer D has all PP individual sheets with a density of about 40 GSM that are bonded together into segment layer D. The PP sheet may have a depth of 0.5-2 mm. Multiple individual sheets are stacked to create a segment with depth and voids. These randomly distributed voids help to capture larger particle sizes above 3 microns to prevent the subsequent layers from clogging prematurely and causing a drop in pressure. This stacking helps creates a more three-dimensional filter segment with greater dust holding capacity and with multidirectional flow.

Figure 37:
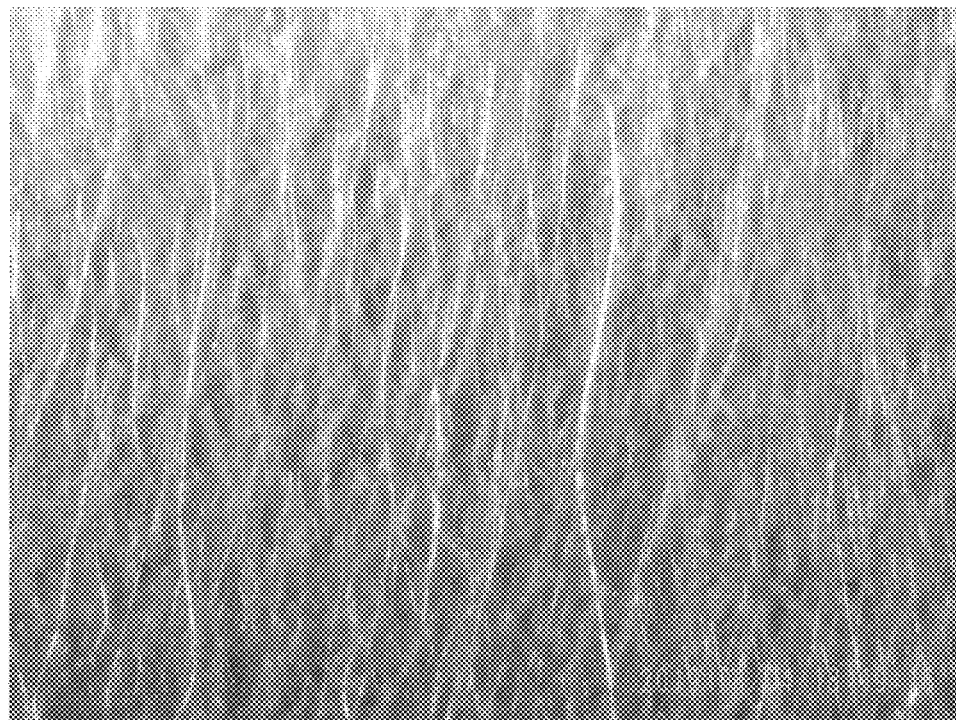
FIGS. 37-39 show surface, profile and stack profile views of segment layer E.
Figure 38:
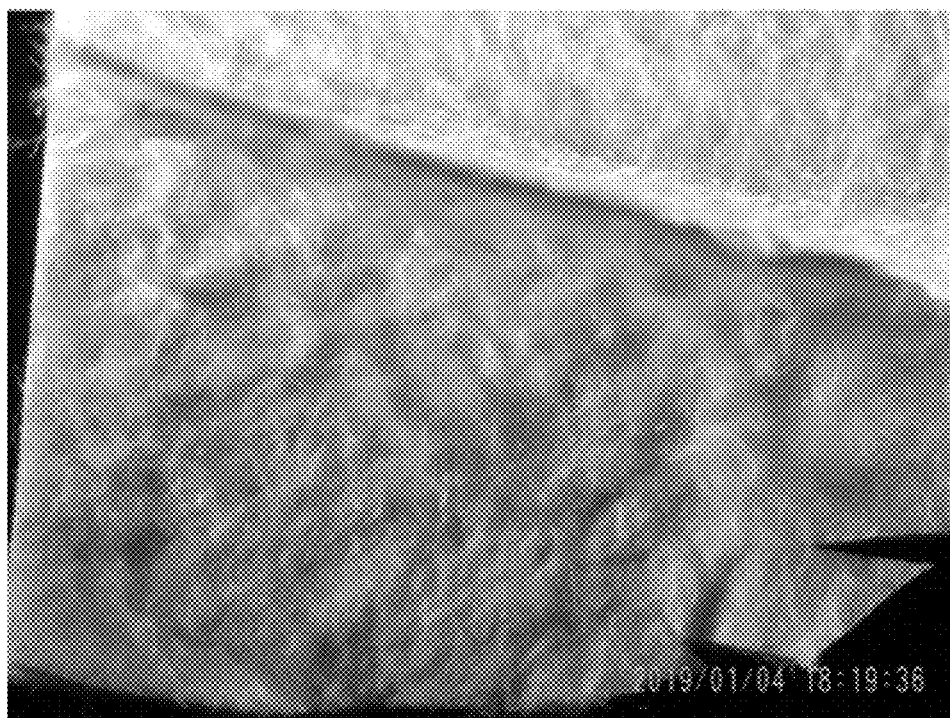
Figure 39:
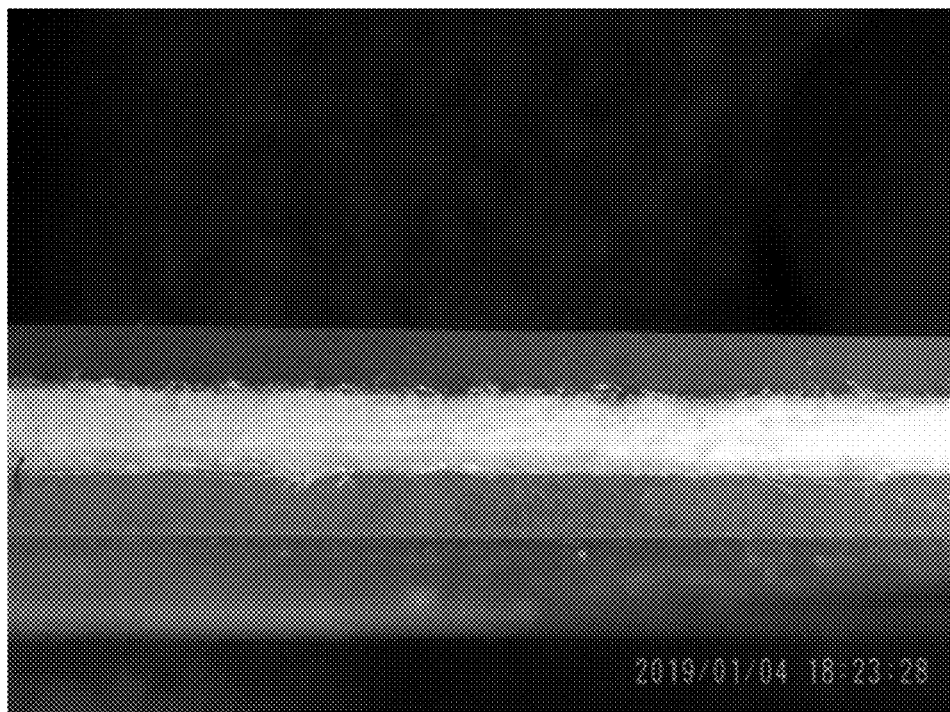

Referring to FIGS. 37-39, segment layer E is shown in surface, cut away and profile views. Segment layer E includes PP on outer surfaces with pseudoboehmite sandwiched in-between. Pseudoboehmite is an aluminum compound with the chemical composition AlO. It consists of finely crystalline boehmite, but with a higher water content than in boehmite.

Segment layer E can be composed of one or more layers of individual sandwich structures with a 6.25 mean micron pore size. The pseudoboehmite creates a further three-dimensional structure to allow better dust loading capacity whilst maintaining randomly distributed micro pore sizes which again helps prevent pressure drop and premature clogging. This helps maintain flow rate and prevent pressure drop with multidirectional flow. Powder activated carbon may also be incorporated in the inside of the sandwich for taste, odor contaminant reduction.

Figure 40:
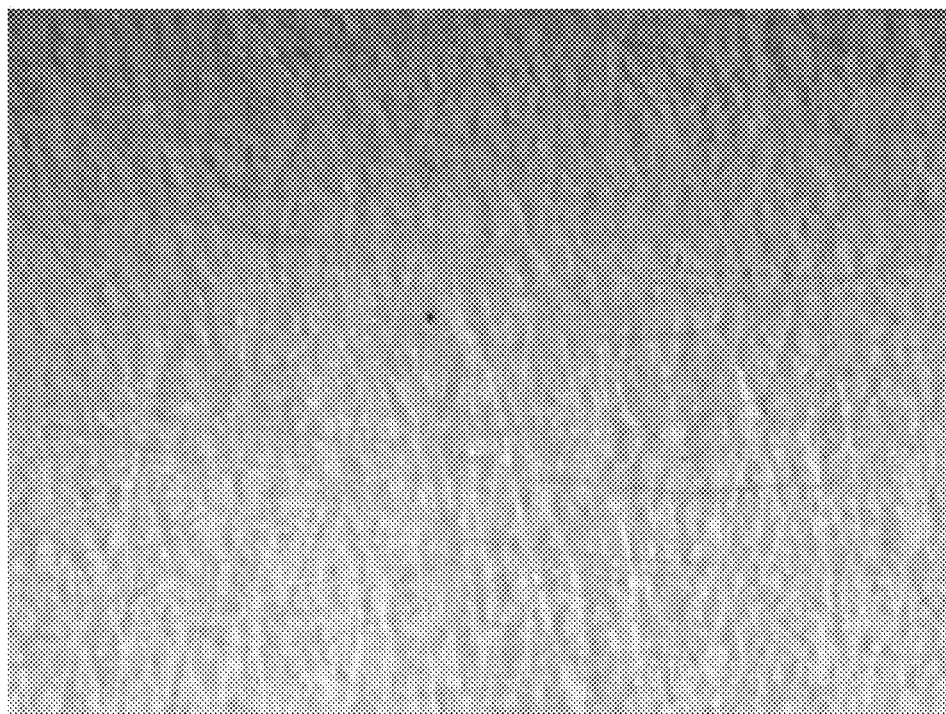
FIGS. 40-42 show surface, profile and stack profile views of segment layer F.
Figure 41:
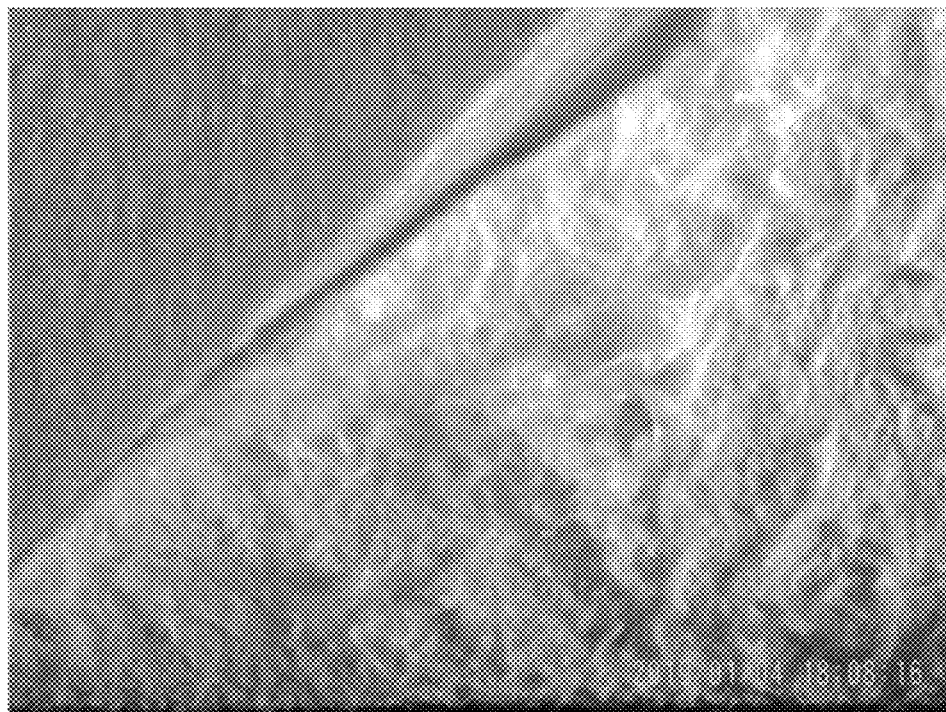
Figure 42:
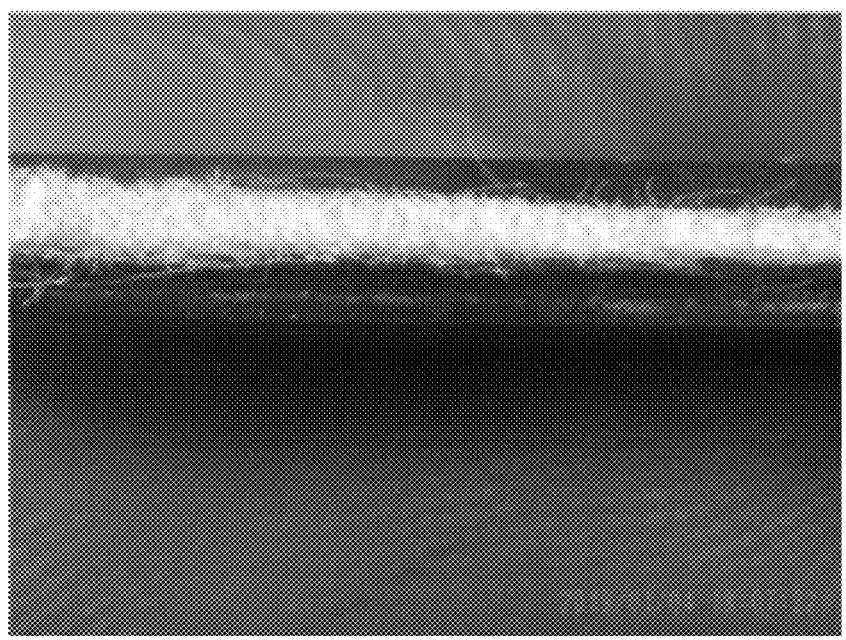

Referring to FIGS. 40-42, segment layer F is shown in surface, cut away and profile views. Similar to segment layer E, segment layer F can be composed of includes PP on outer surfaces with pseudoboehmite sandwiched in-between, however, the individual sandwich structures have a much finer 1.25 micron mean pore size.

Other filter media may be used instead of pseudoboehmite, such as, for example, very fine (small diameter), highly entangled and/or dense layers of PET fibers.

Figure 43:
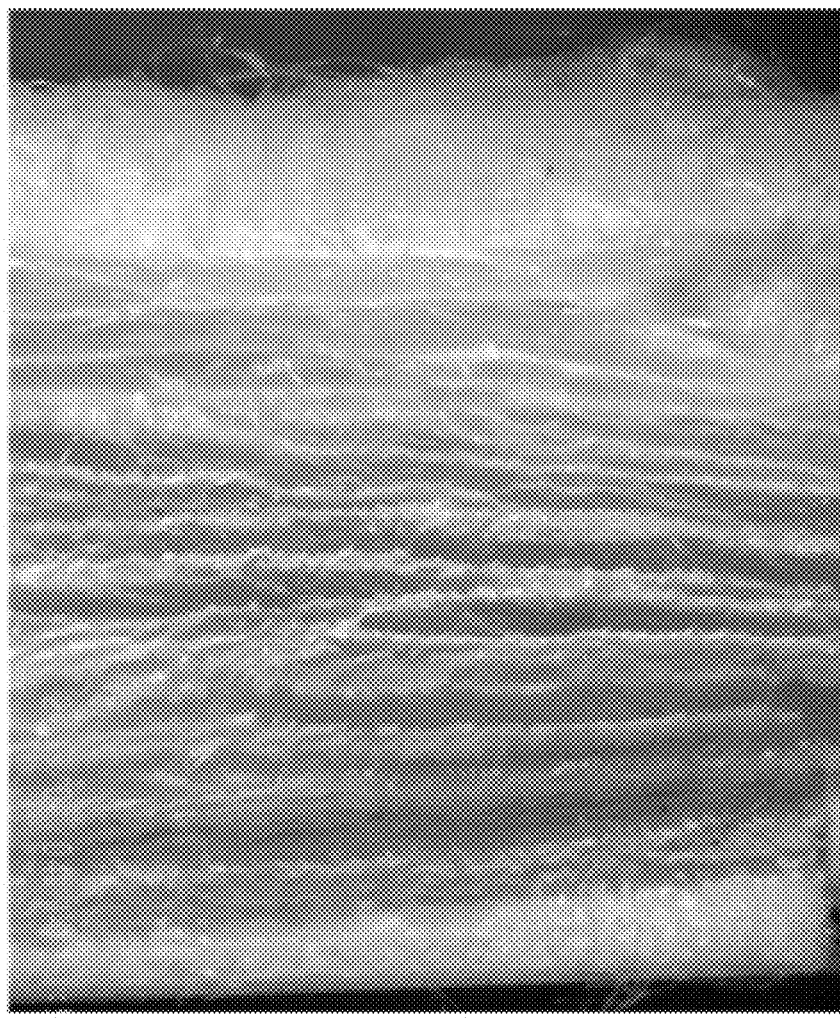
FIGS. 43 and 44 show full stack profiles of segment layers AAA, AA, A, B, C, D, E and F with one bottom exit and two bottom exits, respectively.
Figure 44:
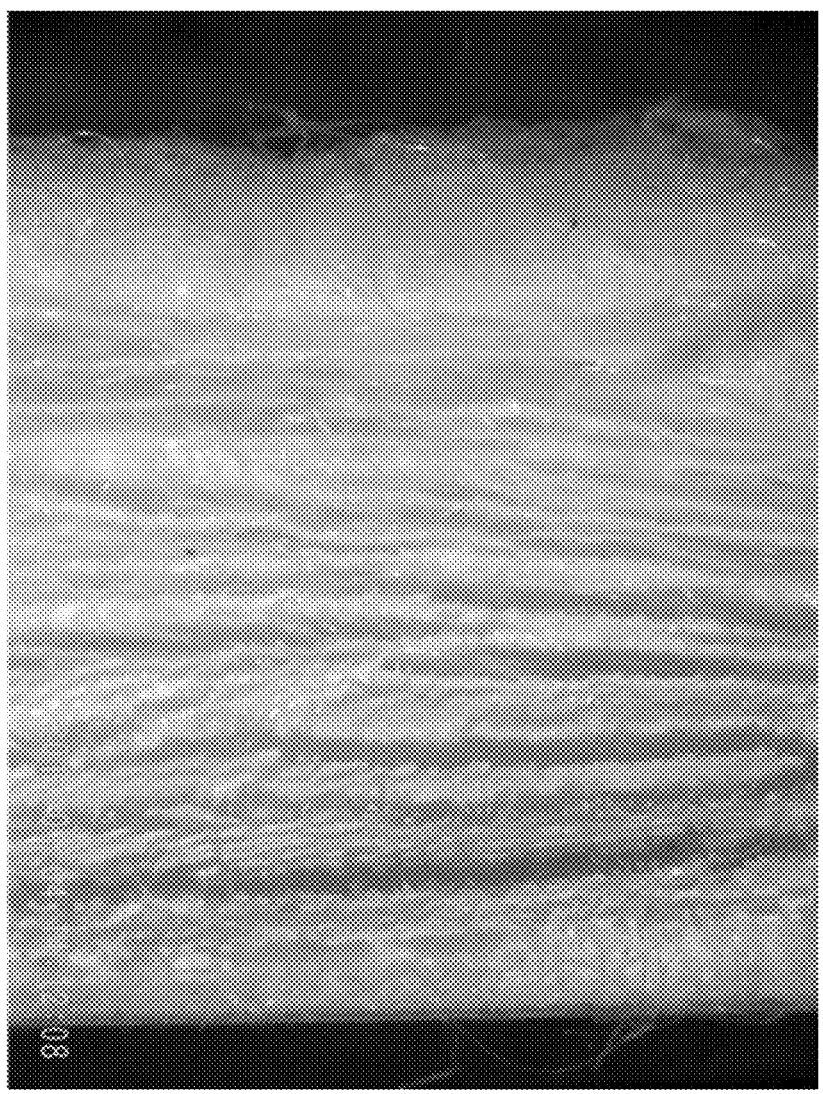
Figure 45:
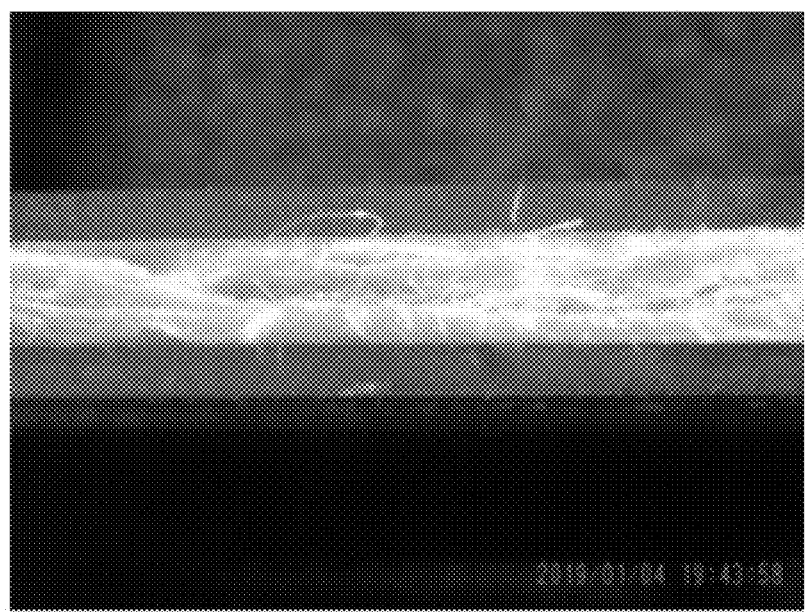
FIG. 45 shows a single layer profile view of one of segment layers AA, A, B, C or D.

FIGS. 43 and 44 are photos of the full stack of segment layers AAA, AA, A, B, C, D and F shown in FIGS. 21-23 mentioned above. All the segment layers are in contact with adjacent layers. The resulting sediment filter has can have a finer pore size and/or higher dust load capacity relative to conventional filters before the sediment filter gets clogged and loses its filtration capacity.

Figure 46:
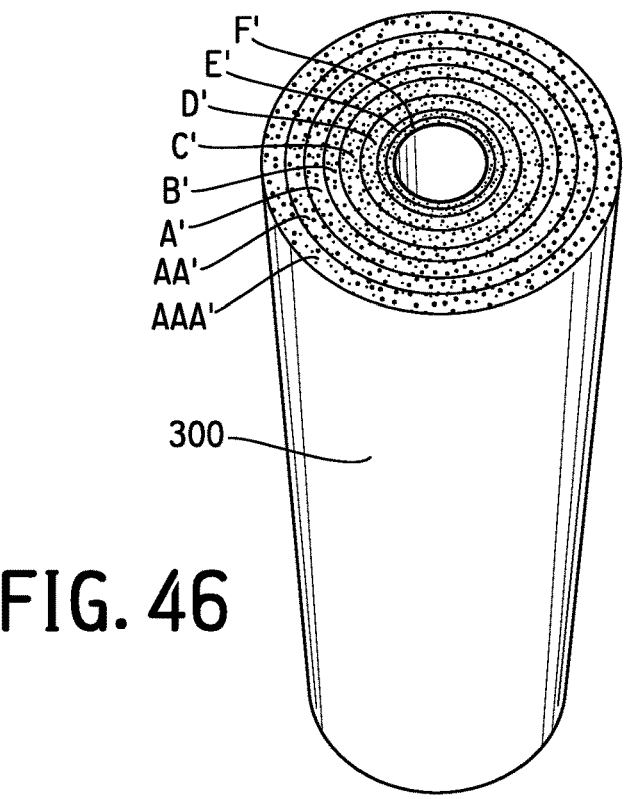
FIGS. 46-48 show another embodiment of a filter of the present invention as a cylindrical filter.
Figure 47:
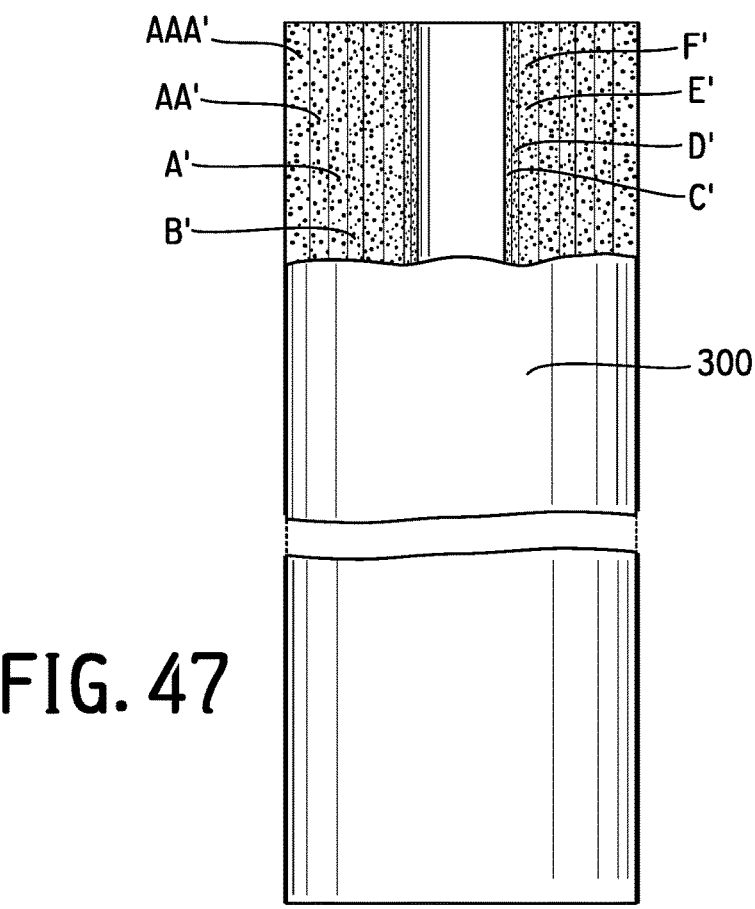

Referring to FIGS. 46 and 47, a cylindrical sediment filter 300 is illustrated with filter media segment layers AAA', AA', A', B', C', D', E' and F' are configured as a concentric ring. Each segment AAA', AA', A', B', C', D', E' and F' are in contact with adjacent segment layers but the surfaces of adjacent segment layers are not bonded together. The composition of the segment layer may be similar to that described above with respect to FIGS. 21-23 and 43-44. In other embodiments, there may be more or less segment layers of different compositions.

Figure 48:
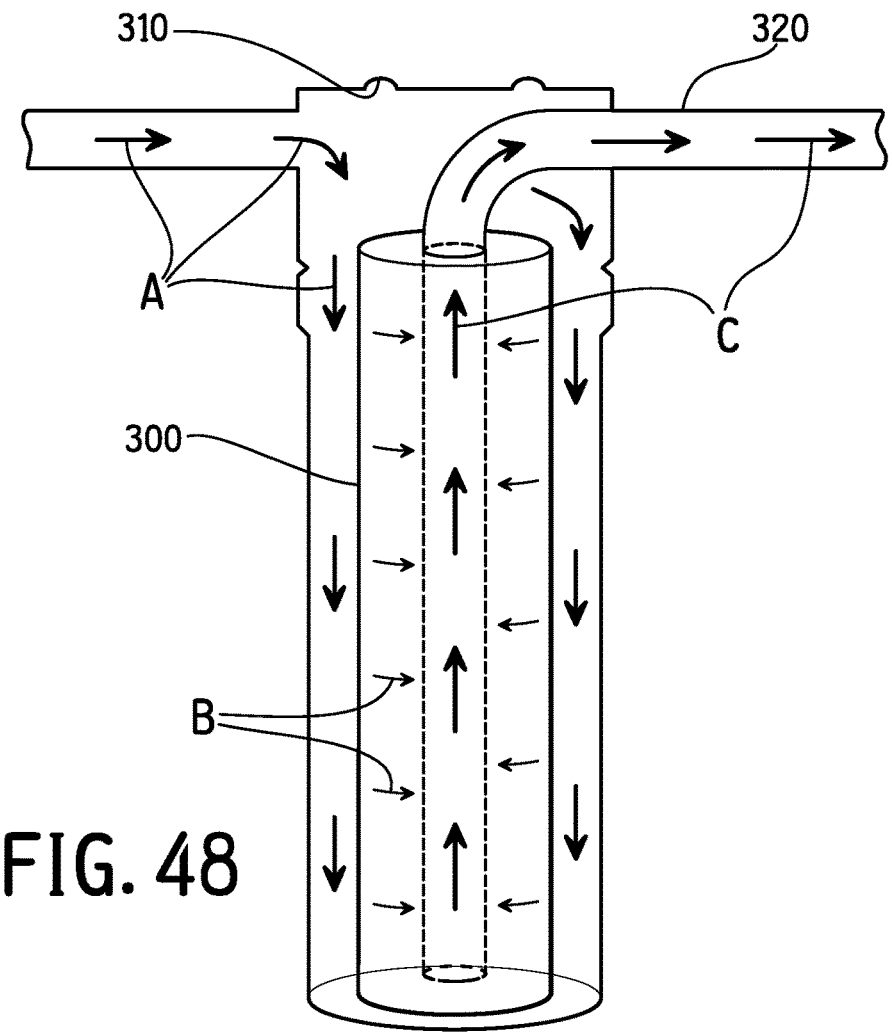

FIG. 48 illustrates the cylindrical sediment filter 300 in use. The cylindrical sediment filter 300 is installed in a filter casing 310. The filter casing has a water input line with water flowing into the filter casing shown by Arrow A.

The bottom of the filter 300 is sealed or pressure fitted against the bottom of the casing such that water flows through the filter as shown by Arrow B. The water flows into an open channel at the center of the filter 300 and flows out of the casing case through output line 330 in the direction shown by Arrow C.

Figure 49:
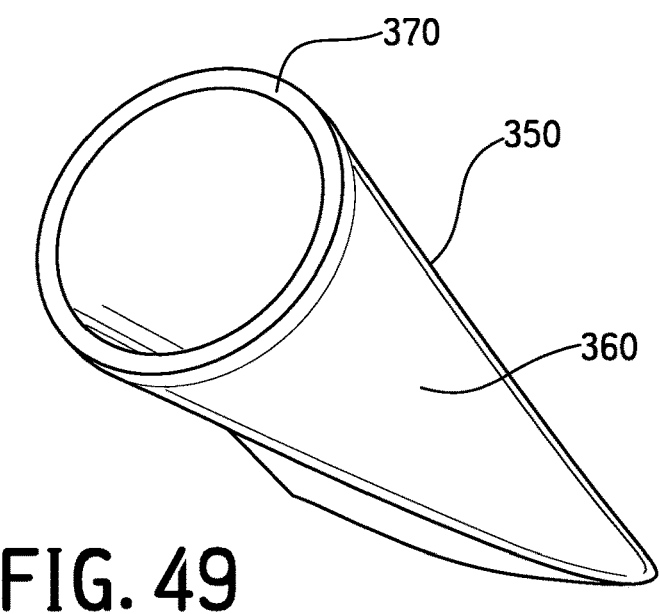
FIG. 49 is another embodiment of a filter of the present invention as a bag filter.

FIG. 49 illustrates another embodiment of a sediment filter configured as a bag filter 350. The bag filter 350 includes multiple segment layers as that described above or may have another configuration of segment layers. The edges of the bag filter 350 may essentially be crimped or secured together by a round collar may be heat bonded or glued together.

The description above has been described with reference to particular embodiments, however, those skilled in the art will understand that various changes may be made and equivalents may be substituted without departing from the spirit and scope of the invention. In addition, many modifications may be made to adapt to a particular situation, material, composition of matter, process, process step or steps, to the objective spirit and scope of the present disclosure. For example, the filter assembly may be incorporated into another type of water vessel, such as, a drum, barrel or a fixed water system. The filter assembly may also be used for other types of liquids. As another example, the sediment filter may have another shape, such as, a rectangle, globe or bag. All such modifications are intended to be within the scope of the claims provided below.

The invention claimed is:

1. A filter assembly, comprising:
   a storage vessel having a fill port and a sediment drain and defining an internal volume with a fluid path between the fill port and the sediment drain;
   a filter housing comprising a cylindrical filter wall with an inlet end and an outlet end;
   a sediment filter disposed within the inlet end and having a sediment filter surface facing the inlet end, wherein a surface of the sediment filter is substantially parallel to the fluid path between the fill port and the sediment drain;
   more than one cylindrical filter proximate to the outlet end, the more than one cylindrical filter each having a cylindrical filter surface, wherein the sediment filter surface is orthogonal to each cylindrical filter surface; and
   a threaded cap that encloses the outlet end of the cylindrical filter wall and configured to receive a threaded collar on the storage vessel, the threaded cap having an exit port fluidly connected to a volume inside an innermost cylindrical filter surface;
   wherein at least a portion of the filter housing is positioned within the internal volume of the storage vessel.

2. The filter assembly of claim 1, wherein the sediment filter comprises a generally circular disk.

3. The filter assembly of claim 1, wherein the more than one cylindrical filter comprises more than one cylindrical filter in a concentric ring.

4. The filter assembly of claim 1, wherein a first channel and a second channel fluidly connect the sediment filter to the more than one cylindrical filter and wherein the first channel has a first central axis that is orthogonal to a cylindrical filter central axis of the more than one cylindrical filter.

5. The filter assembly of claim 4, wherein a second central axis of the second channel is parallel to the cylindrical filter central axis.

6. The filter assembly of claim 1, wherein the more than one cylindrical filter comprises an annular ring of activated carbon.

7. The filter assembly of claim 6, wherein the more than one cylindrical filter comprises a plurality of pleated media filters configured in a concentric ring inside the annular ring of activated carbon.

8. The filter assembly of claim 7, further comprising an outlet tube in the center of the concentric ring, wherein the outlet tube comprises a wall that causes a water flow to change direction from a direction that is orthogonal to a central axis of the pleated media filters to a direction that is parallel to the central axis of the pleated media filters.

9. A filter assembly for a fluid container, comprising:
   a filter housing having a cylindrical filter wall with an inlet end and an outlet end;
   a sediment filter disposed within the inlet end and having a sediment filtering surface facing the inlet end, wherein the sediment filter comprises a generally circular disk;
   more than one cylindrical filter in a concentric ring;
   a channel to fluidly connect the sediment filter to the more than one cylindrical filter;
   an outlet tube in the center of the concentric ring, wherein the outlet tube comprises a wall that causes a water flow to change direction from a direction that is orthogonal to a central axis of the more than one cylindrical filter to a direction that is parallel to a central axis of the more than one cylindrical filter in the direction of the sediment filter and to reverse direction away from the sediment filter to reach an outlet at the end of the outlet tube;
   a threaded cap with the outlet, the threaded cap configured to receive a threaded collar on a fluid vessel; and
   a fluid container with a fill port and a sediment drain, wherein the fluid container includes an internal volume that defines a first fluid path from the fill port to the sediment drain and a second fluid path from the inlet end through the sediment filter that is generally orthogonal to the first fluid path and wherein the fluid container receives at least a portion of the filter housing.

10. The filter assembly of claim 9, wherein the sediment filter surface is orthogonal to each cylindrical filtering surface of the more than one cylindrical filter.

11. The filter assembly of claim 9, wherein the more than one cylindrical filter comprises an annular ring of activated carbon.

12. The filter assembly of claim 11, wherein the more than one cylindrical filter comprises a plurality of corrugated media filters configured in a concentric ring inside the annular ring of activated carbon.

13. The filter system of claim 1, further comprising the storage vessel having a substantially vertical wall with an opening, wherein the filter housing is received within the opening of the vertical wall.

14. The filter assembly of claim 1, further comprising the storage vessel having a substantially vertical wall and the sediment filter surface is substantially parallel to the vertical wall such that non-buoyant particles bypass the sediment filter.

15. A filter system, comprising:
   a filter assembly that includes
      a filter housing comprising an inlet end and an outlet end,
      a sediment filter disposed proximate to the inlet end and having a sediment filter surface facing the inlet end,
      at least one cylindrical filter proximate to the outlet end, the at least one cylindrical filter having a cylindrical filter surface, wherein the sediment filter surface is orthogonal to the cylindrical filter surface, and
      a cap that encloses the outlet end of the filter housing, the cap having an exit port fluidly connected to a volume inside the at least one cylindrical filter; and
   a container with a vertical wall having an opening, a fill port and a sediment drain wherein a first fluid path is defined inside the container from the fill port to the sediment drain that bypasses a second fluid path from the inlet end through the sediment filter such that sediment particles exit the container without passing through the filter assembly;

wherein the cap is securable to the vertical wall with the filter assembly inserted through the opening in the vertical wall.

16. The filter system of claim 15, further comprising an inner ported circular wall within the filter housing to divide the filter housing into a sediment filter chamber and a cylindrical filter chamber;
   wherein the sediment filter is disposed in the sediment filter chamber; and
   the cylindrical filter is disposed within the cylindrical filter chamber.

17. The filter system of claim 1, wherein the fluid path from the fill port to the sediment drain bypasses a fluid path through the sediment filter.

18. The filter assembly of claim 9, wherein a surface of the sediment filter is parallel to the first fluid path.

19. The filter system of claim 15, wherein the surface of the sediment filter is parallel to the first fluid path.

\* \* \* \* \*